(12) United States Patent
Murphy et al.

(10) Patent No.: US 12,472,664 B2
(45) Date of Patent: Nov. 18, 2025

(54) REBONDED FOAM MOLDING MACHINE, SYSTEM, AND METHOD

(71) Applicant: Hickory Springs Manufacturing Company, Hickory, NC (US)

(72) Inventors: David Murphy, High Point, NC (US); Michael Heyn, Hickory, NC (US); Alex Wesley, Huntersville, NC (US)

(73) Assignee: HICKORY SPRINGS MANUFACTURING COMPANY, Hickory, NC (US)

( * ) Notice: Subject to any disclaimer, the term of this patent is extended or adjusted under 35 U.S.C. 154(b) by 229 days.

(21) Appl. No.: 18/221,503

(22) Filed: Jul. 13, 2023

(65) Prior Publication Data

US 2025/0018622 A1    Jan. 16, 2025

(51) Int. Cl.
*B29C 43/56*   (2006.01)
*B29C 43/00*   (2006.01)
*B29C 43/02*   (2006.01)
*B29C 43/36*   (2006.01)
*B29C 43/52*   (2006.01)
*B29K 75/00*   (2006.01)
*B29K 105/00*  (2006.01)
*B29K 105/04*  (2006.01)
*B29K 105/26*  (2006.01)
*B29L 31/00*   (2006.01)

(52) U.S. Cl.
CPC ............ *B29C 43/56* (2013.01); *B29C 43/003* (2013.01); *B29C 43/02* (2013.01); *B29C 43/36* (2013.01); *B29C 43/52* (2013.01); *B29C 2043/561* (2013.01); *B29K 2075/00* (2013.01); *B29K 2105/0026* (2013.01); *B29K 2105/04* (2013.01); *B29K 2105/251* (2013.01); *B29K 2105/26* (2013.01); *B29L 2031/771* (2013.01)

(58) Field of Classification Search
CPC ......... B29C 71/02; B29C 44/56; B29C 44/12; B29C 44/02; B29C 2045/363; B29C 2045/0089; B29C 2045/0087; B29C 2043/3652
See application file for complete search history.

(56) References Cited

U.S. PATENT DOCUMENTS

| | | |
|---|---|---|
| 4,069,285 A | 1/1978 | Morgan |
| 5,175,194 A | 12/1992 | Ward |
| 6,651,276 B2 | 11/2003 | McCraw |
| 10,391,896 B1 | 8/2019 | Daniels |
| 10,682,930 B1 | 6/2020 | Daniels |

*Primary Examiner* — Stella K Yi
(74) *Attorney, Agent, or Firm* — BURR & FORMAN

(57) ABSTRACT

A method for molding a seamless rebonded foam article with an internal cavity is provided. The method may include moving a middle mold to a middle mold form position within the mold cavity to press into a first portion of rebond foam particles, and moving a top mold to a top mold form position within the mold cavity to press into the second portion of rebond foam particles. The method may further include injecting steam into the mold cavity at a middle mold fluid port interface of the middle mold such that the steam passes into the mold cavity to interact with the first and second portions of rebond foam particles via at least one middle mold flow hole in the middle mold, and evacuating the steam via a vacuum source coupled to the top mold and the bottom mold.

11 Claims, 26 Drawing Sheets

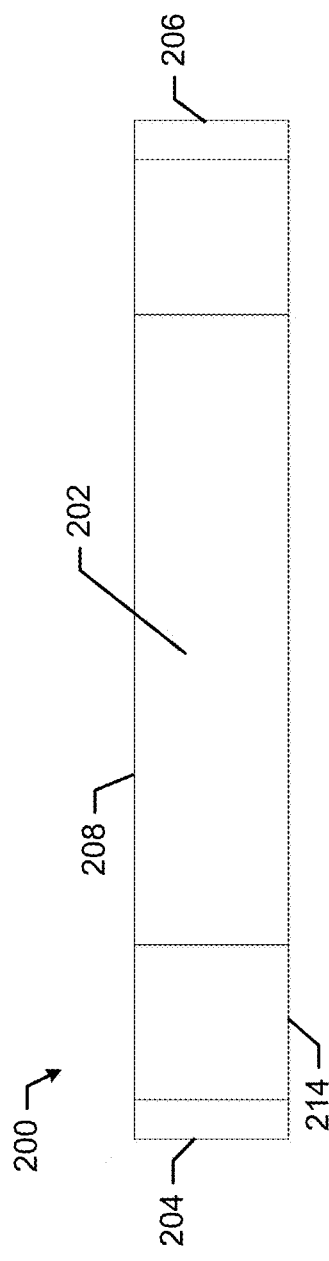
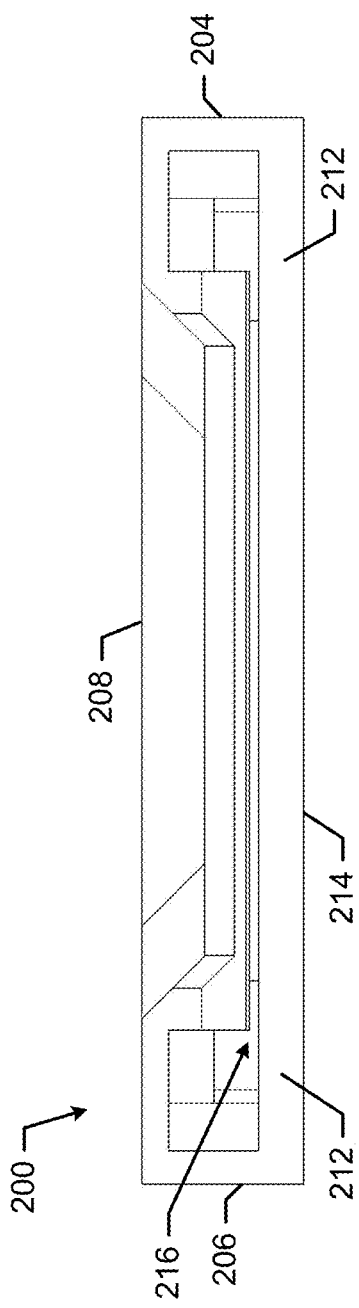

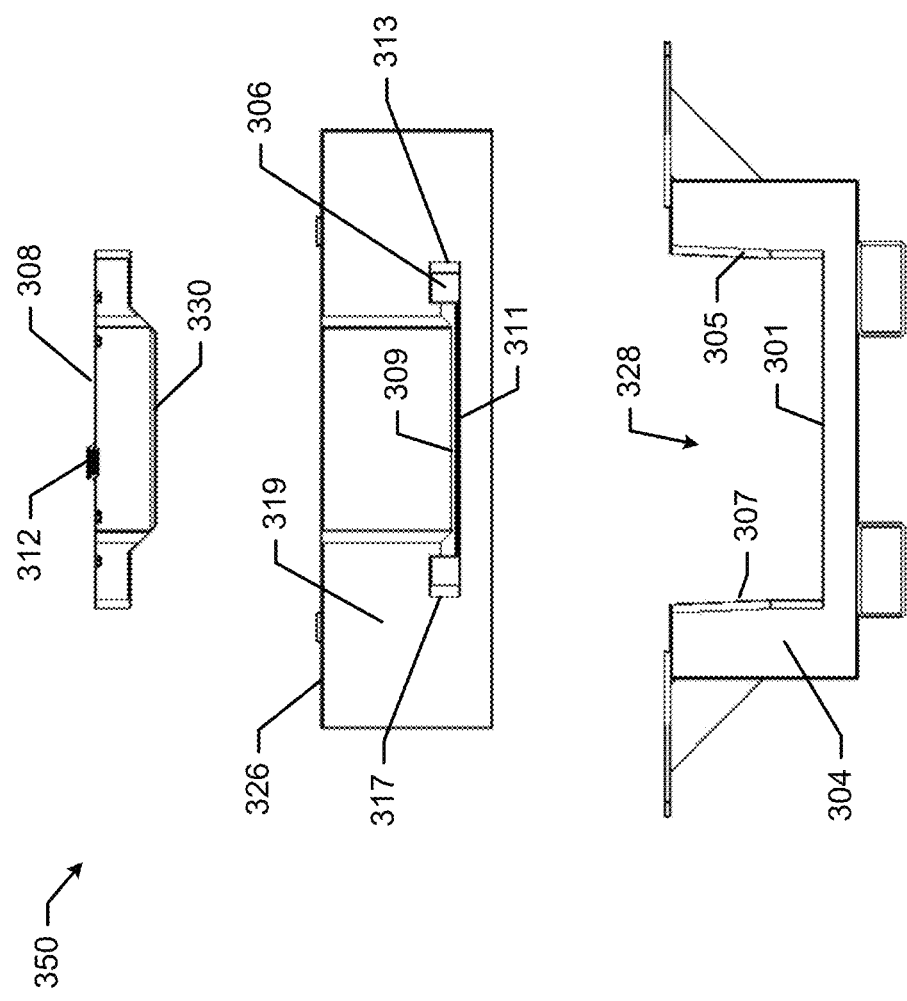

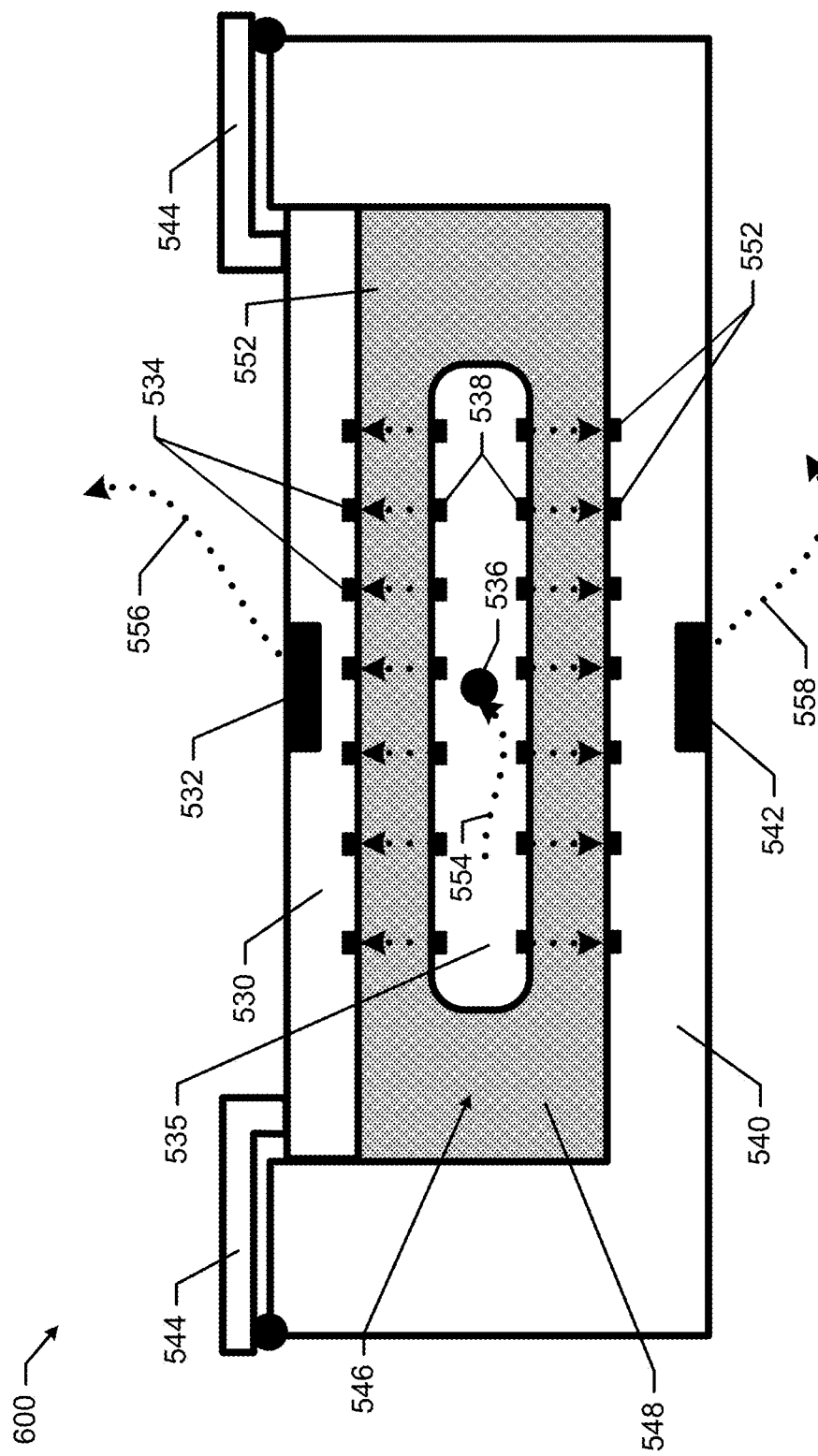

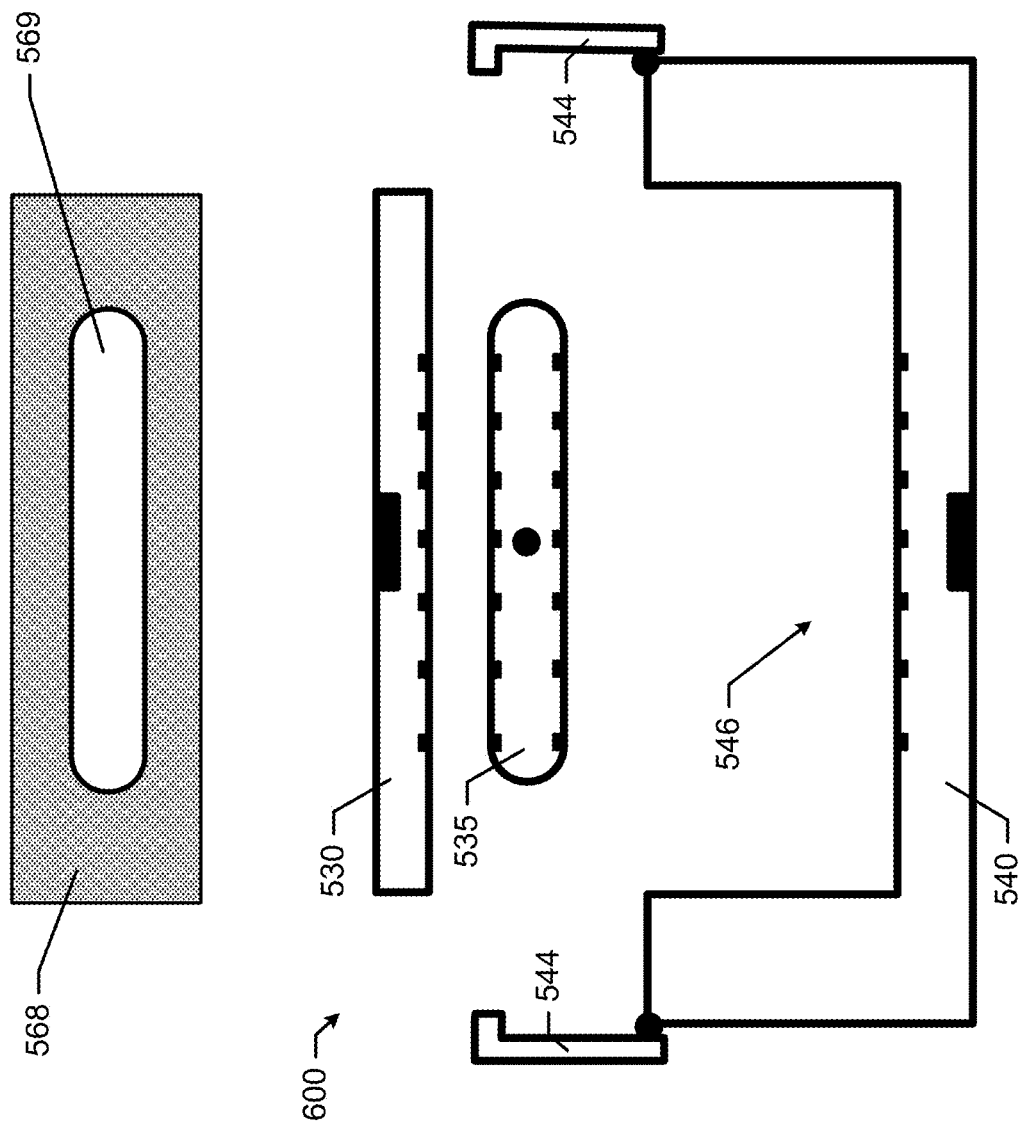

REBONDED FOAM MOLDING MACHINE, SYSTEM, AND METHOD

TECHNICAL FIELD

Example embodiments generally relate to foam molding technologies and, in particular, rebonded foam molding.

BACKGROUND

The use of rebonded foam in the production of new products involves reuse or repurposing of scrap and discarded foam from other processes and products to reduce amount of foam that is disposed in landfills. While the use of rebonded foam is beneficial in this way, there are limitations on the use of rebonded foam in manufacturing processes. Since rebonded foam, in some instances, may not flow into a molding environment in the same manner as virgin foam substances, the use of rebonded foam can introduce additional challenges to the manufacture of more complex, molded articles. As such, manufacturing with rebonded foam for more complex designs often involves the molding of many component parts and then assembling the component parts into a finished article, often by hand, by gluing the individual component parts together. Such assembly can result in manufacturing inefficiencies with respect to time and quality issues. Further, the introduction of the glue seams in the finished product can create inherent fault lines in the article were the integrity of the finished article is likely to fail.

BRIEF SUMMARY OF SOME EXAMPLES

According to some example embodiments, a method for molding a seamless rebonded foam article with an internal cavity is provided. The example method may comprise loading a mold cavity, formed at least partially by a bottom mold, with a first portion of rebond foam particles to a first threshold volume. In this regard, the rebond foam particles may comprise an adhesive. The example method may further comprise moving a middle mold, via a middle mold actuator assembly controlled by mold system control circuitry, to a middle mold form position within the mold cavity to press into the first portion of rebond foam particles. The middle mold may have a width that is less than a width of the mold cavity. The example method may further comprise loading the mold cavity with a second portion of rebond foam particles to a second threshold volume that covers the middle mold, and moving a top mold, via a top mold actuator assembly controlled by the mold system control circuitry, to a top mold form position within the mold cavity to press into the second portion of rebond foam particles. The top mold may have a complementary shape to the mold cavity to compress the first and second portions of rebond foam particles. The example method may further comprise injecting steam into the mold cavity at a middle mold fluid port interface of the middle mold. In this regard, the steam may pass into the mold cavity to interact with the first and second portions of rebond foam particles via at least one middle mold flow hole in the middle mold. The example method may further comprise evacuating the steam from the mold cavity via a vacuum source coupled to a bottom mold fluid port interface and a top mold fluid port interface. The bottom mold fluid port interface may be fluidly coupled to the mold cavity via at least one bottom mold flow hole in the bottom mold and the top mold fluid port interface may be fluidly coupled to the mold cavity via at least one top mold flow hole in the top mold. The example method may also comprise, subsequent to injecting steam for a steaming duration to cure the first and second portions of rebond foam particles into a seamless article, discontinuing the injection of the steam and injecting compressed air into the mold cavity via the middle mold fluid port interface to remove the steam, and moving the middle mold and the top mold out of the mold cavity for removal of the seamless rebonded foam article by removing the middle mold from the internal cavity of the seamless rebonded foam article.

According to some example embodiments, a rebonded foam molding machine is provided. The rebonded foam molding machine may comprise a top mold comprising a top mold contact surface and a top mold fluid port. The top mold contact surface may comprise at least one top mold flow hole. The rebonded foam molding machine may further comprise a middle mold comprising a first middle mold contact surface, a second middle mold contact surface, and a middle mold fluid port. The first middle mold contact surface or the second middle mold contact surface may comprise at least one middle mold flow hole. The rebonded foam molding machine may comprise a bottom mold comprising a bottom mold fluid port and a bottom mold contact surface shaped to form at least a portion of a mold cavity. The bottom mold contact surface may comprise at least one bottom mold flow hole. The rebonded foam molding machine may further comprise a middle mold actuator assembly configured to move the middle mold into a middle mold form position within the mold cavity, and a top mold actuator assembly configured to move the top mold into a top mold form position within the mold cavity above the middle mold in the middle mold form position. A mold space may be defined by an interior space of the mold cavity between the top mold in the top mold form position, the middle mold in the middle mold form position, and the bottom mold. The mold space may be configured to retain rebond foam particles for molding a seamless rebonded foam article with an internal cavity. The middle mold fluid port may be configured to inject steam and compressed air into the mold space via the at least one middle mold flow hole, and the top mold fluid port may be configured to evacuate steam and compressed air from the mold space via the at least one top mold flow hole. The bottom mold fluid port may be configured to draw steam and compressed air from the mold space via the at least one top mold flow hole. The middle mold actuator and the top mold actuator may be further configured to move the middle mold and the top mold out of the mold cavity to permit removal of the seamless rebonded foam article from the middle mold disposed within the internal cavity of the seamless rebonded foam article.

According to some example embodiments, another method for molding a seamless rebonded foam article with an internal cavity is provided. The method may comprise moving a middle mold, via a middle mold actuator assembly controlled by mold system control circuitry, to a middle mold form position within the mold cavity to press into a first portion of rebond foam particles. The middle mold may have a width that is less than a width of the mold cavity. The example method may further comprise moving a top mold, via a top mold actuator assembly controlled by the mold system control circuitry, to a top mold form position within the mold cavity to press into a second portion of rebond foam particles. The top mold may have a complementary shape to the mold cavity to compress the first and second portions of rebond foam particles. The example method may further comprise injecting steam into the mold cavity at a middle mold fluid port interface of the middle mold. The steam may pass into the mold cavity to interact with the first and second portions of rebond foam particles via at least one middle mold flow hole in the middle mold. The example method may further comprise evacuating the steam from the mold cavity via a vacuum source coupled to a bottom mold fluid port interface and a top mold fluid port interface. The bottom mold fluid port interface may be fluidly coupled to the mold cavity via at least one bottom mold flow hole in the bottom mold and the top mold fluid port interface may be fluidly coupled to the mold cavity via at least one top mold flow hole in the top mold. The example method may further comprise, subsequent to injecting steam for a steaming duration to cure the first and second portions of rebond foam particles into a seamless article, discontinuing the injection of the steam and injecting compressed air into the mold cavity via the middle mold fluid port interface to remove the steam, and moving the middle mold and the top mold out of the mold cavity for removal of the seamless rebonded foam article.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 2G illustrates a top view of a seatback according to some example embodiments;

FIG. 2H illustrates a bottom view of a seatback according to some example embodiments;

FIG. 4E illustrates a cross-section view of the mold assembly of FIG. 4D taken at cross-section A-A of FIG. 4D according to some example embodiments;

FIGS. 6A to 6J illustrate various operational states of mold components involved in constructing a seamless rebonded foam article with an internal cavity according to some example embodiments.

DETAILED DESCRIPTION

Figure 1A:
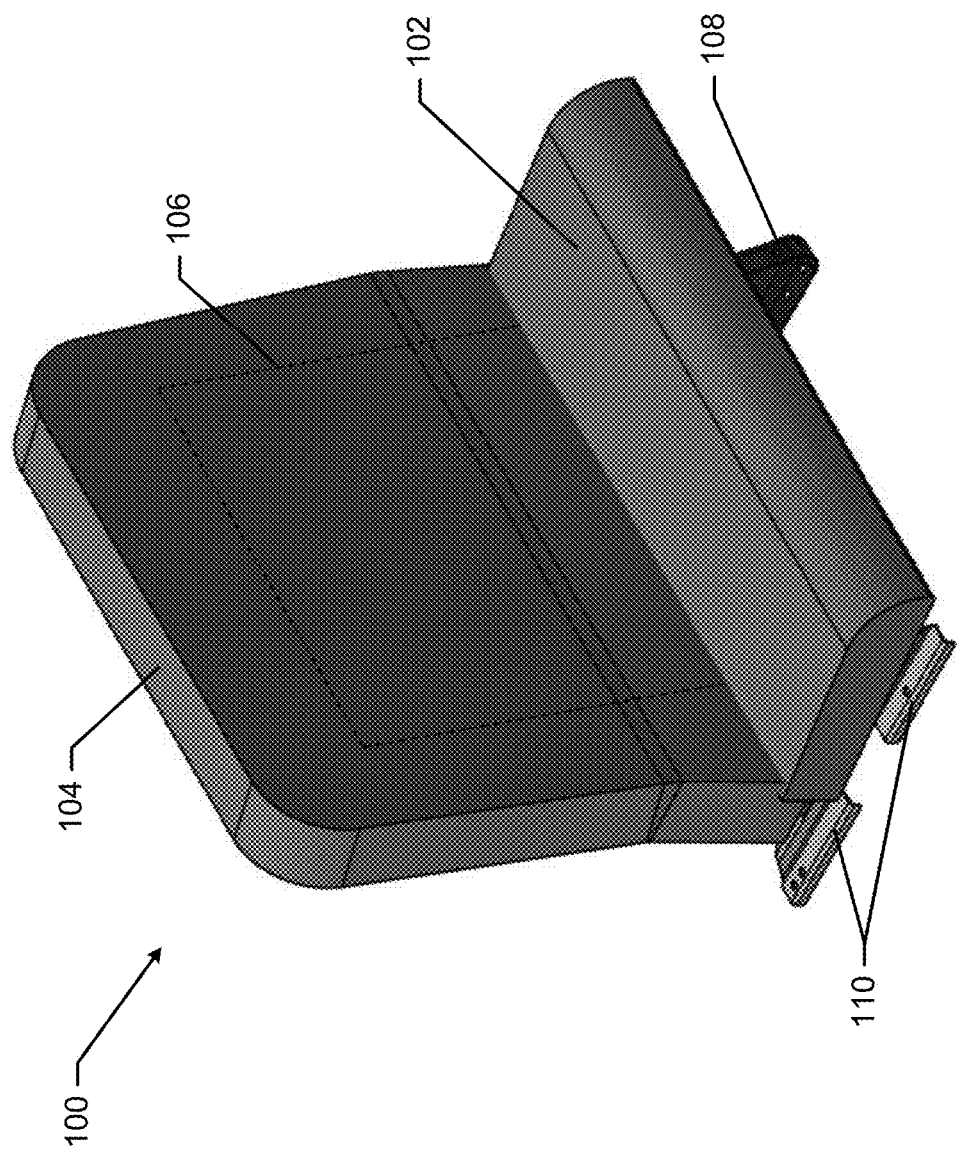
FIG. 1A illustrates a perspective front view of a seat according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. As used herein, the term "about" with reference to a measurement is intended to mean the measurement itself within reasonable manufacturing tolerances, industry construction limitations, and the like.

Following from the issues raised above with respect to rebonded foam manufacturing, example embodiments provided herein describe machines, systems, apparatuses, and methods for constructing rebonded foam articles without seams that comprise at least an internal cavity. As such, according to some example embodiments, manufacturing efficiencies can be realized since the gluing of separately molded component parts is not required to form the final article. Additionally, since the article is molded in as a singular, unitary article in an individual molding process, the rebonded foam article does not include the inherent failure points and potential quality issues introduced by seams, thereby resulting in a more robust, durable, and consistently high quality final rebonded foam article.

According to some example embodiments, a process for molding a seamless rebonded foam article may comprise implementation of a bottom mold that forms a mold cavity, a middle mold that moves into the mold cavity to form an internal cavity in the article, and a top mold that moves into the mold cavity over the middle mold to cap the mold space defined by the molds. Prior to positioning the middle mold and the top mold in these positions, rebond foam particles may be placed within the mold cavity at certain times in the process such that the rebond foam particles fill the mold space formed by the molds. Due to the size of the middle mold, the rebond foam particles may surround the middle mold within the mold space and be compressed by pressures within the mold space applied by the middle mold and the top mold. As mentioned above, the middle mold may be positioned to form an internal cavity within the rebonded foam article. In this relatively central location, the middle mold also provides an advantageous position to inject steam into the mold space for curing the rebond foam particles (e.g., using an inside-out approach to the curing and drying processes).

In this regard, steam may be injected into a middle mold fluid port interface that is fluidly coupled with middle mold flow holes in the external surfaces of the middle mold. Such flow holes may be small diameter holes configured to permit passage of steam and air into the mold space from the centrally located middle mold. As such, via these middle mold flow holes, steam may introduced into the mold space from the interior of the article being formed. Additionally, the bottom mold and the top mold may also comprise flow holes referred to as bottom mold flow holes and top mold flow holes, respectively. The bottom mold flow holes and the top mold flow holes may be structured the same or similar to the middle mold flow holes. The bottom mold flow holes may be fluidly coupled to a bottom mold fluid port interface, and the top mold flow holes may be fluidly coupled to a top mold fluid port interface. The bottom mold fluid port interface and the top mold fluid port interface may be operably coupled to a vacuum source to draw the steam or drying air through the mold space to the external surfaces of the mold space in a somewhat radial fashion. Such positioning of the top mold flow holes and the bottom mold flow holes in this manner distributes the steam and air flow through the rebond foam particles within the mold space to cause highly effective steam and air flows resulting in improved adhesion and curing of the rebond foam particles, and also reduces the times required for the curing and drying processes.

In this regard, steam may be introduce to active the adhesive in the rebond foam particles and upon conclusion of the steam process, compressed air may be injected into the middle mold fluid port interface to force the residual steam and moisture from the mold space with the continued assistance of the vacuum source via the top mold flow holes and the bottom mold flow holes. In this manner, the drying process can be greatly accelerated relative to conventional approaches. Upon completion of drying, the middle mold and the top may be moved out of the mold cavity, and the seamless rebonded foam article may be removed from the middle mold, which is disposed in the internal cavity of the article.

Figure 1B:
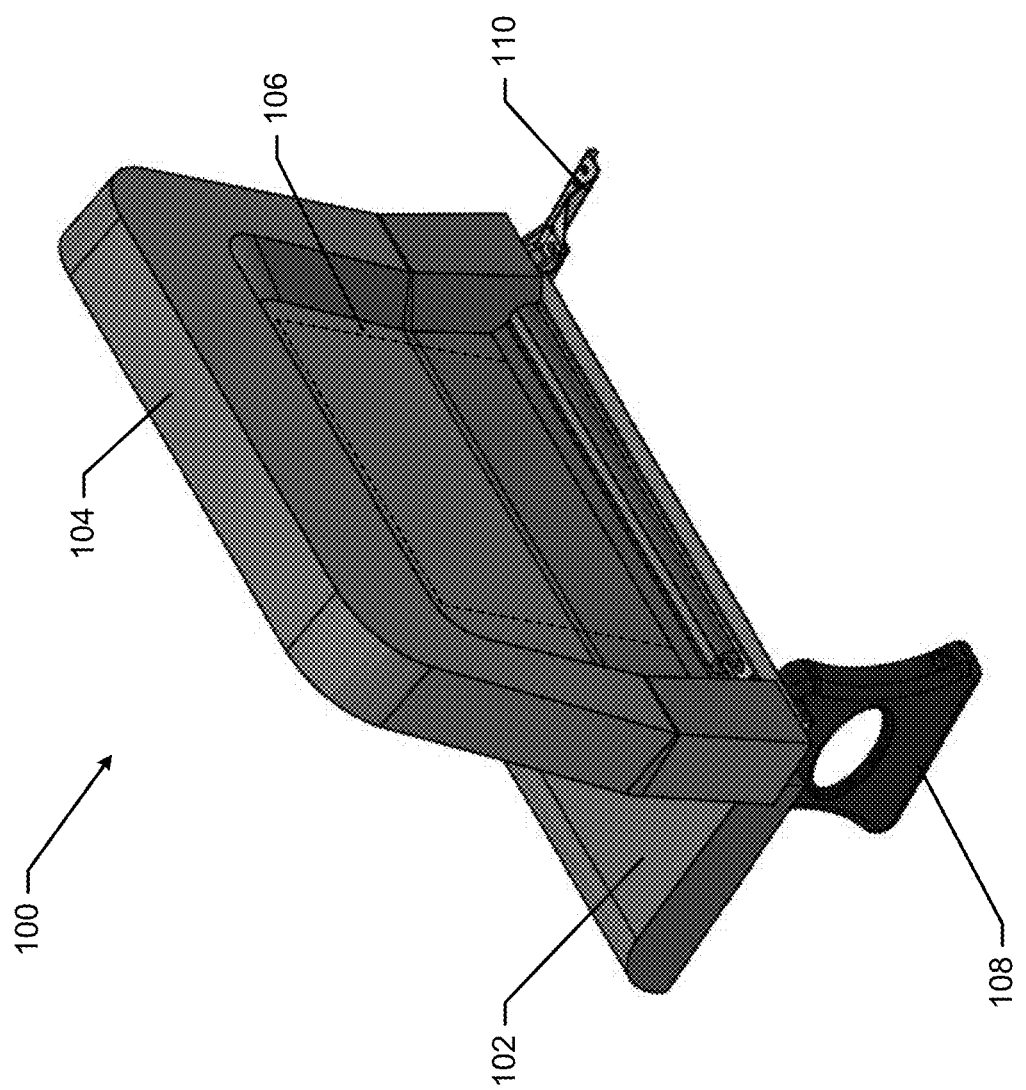
FIG. 1B illustrates a perspective back view of a seat according to some example embodiments.
Figure 2B:
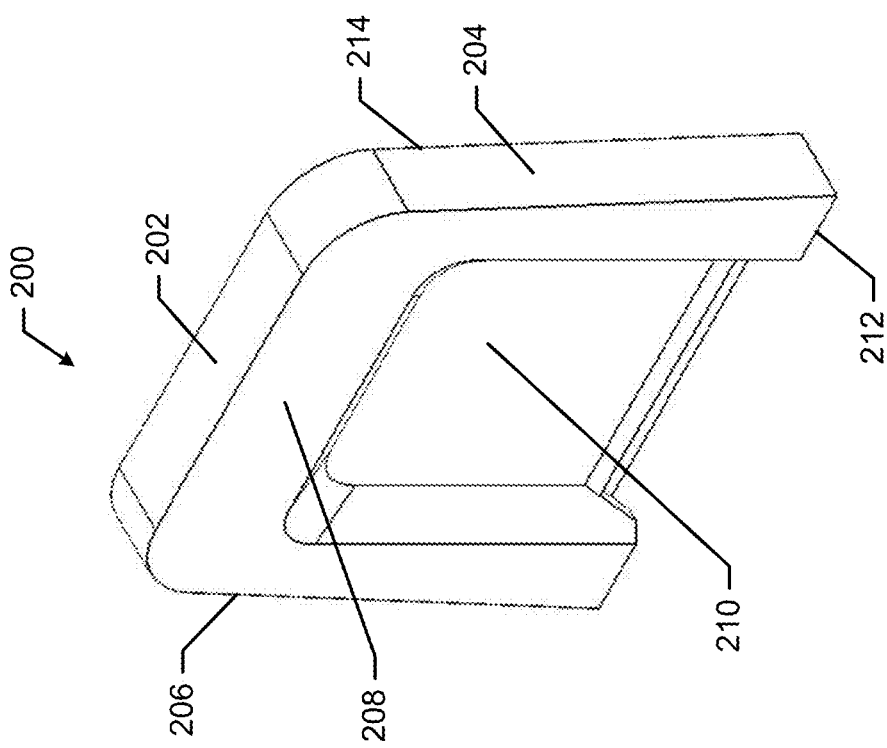
FIG. 2B illustrates a perspective back view of a seatback according to some example embodiments.
Figure 2A:
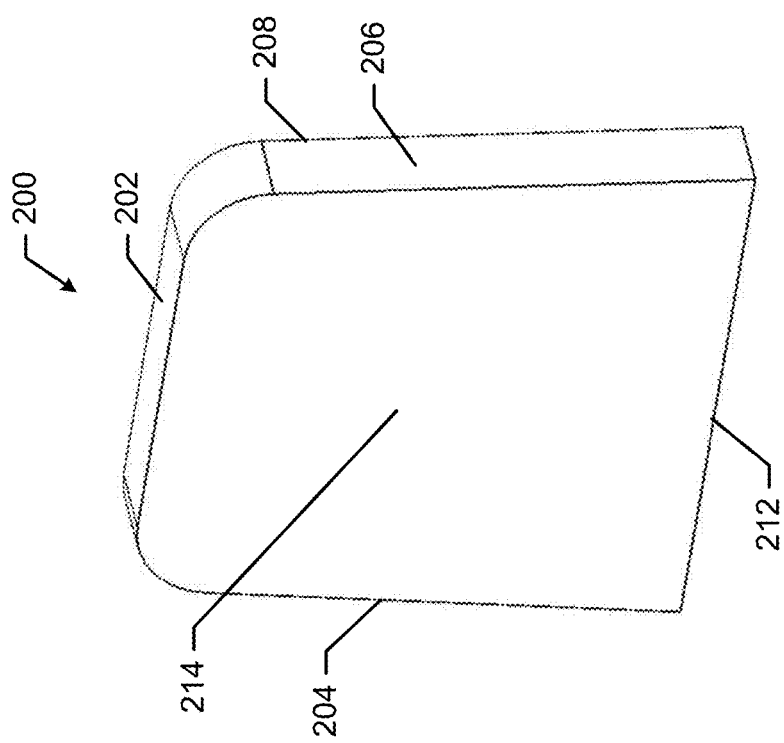
FIG. 2A illustrates a perspective front view of a seatback according to some example embodiments.
Figure 2D:
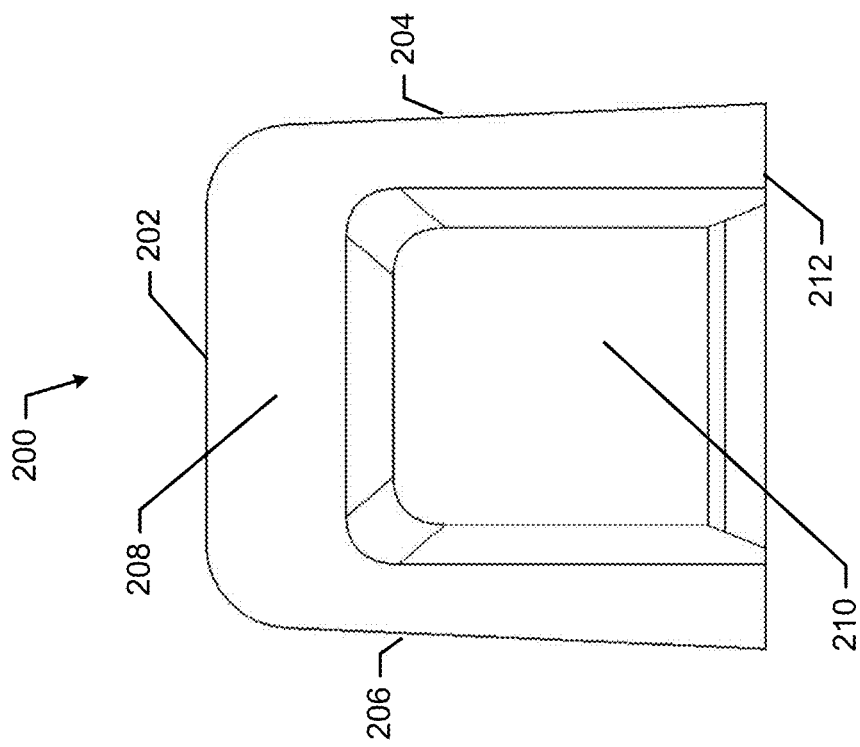
FIG. 2D illustrates a back view of a seatback according to some example embodiments.
Figure 2C:
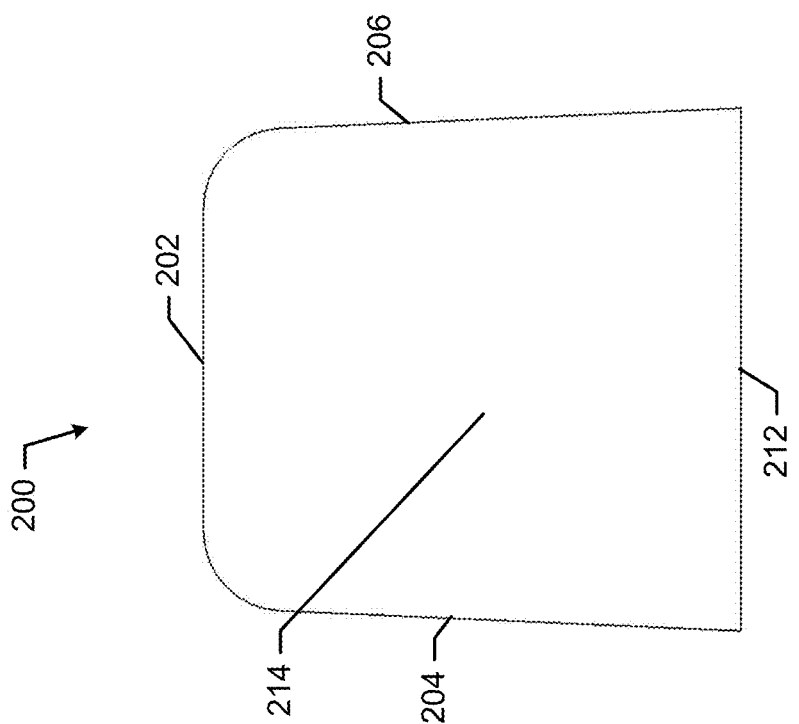
FIG. 2C illustrates a front view of a seatback according to some example embodiments.
Figure 2F:
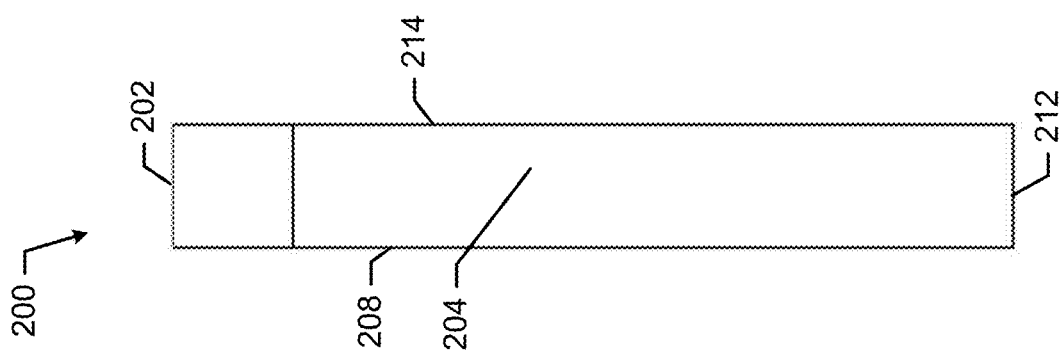
FIG. 2F illustrates a left side view of a seatback according to some example embodiments.
Figure 2E:
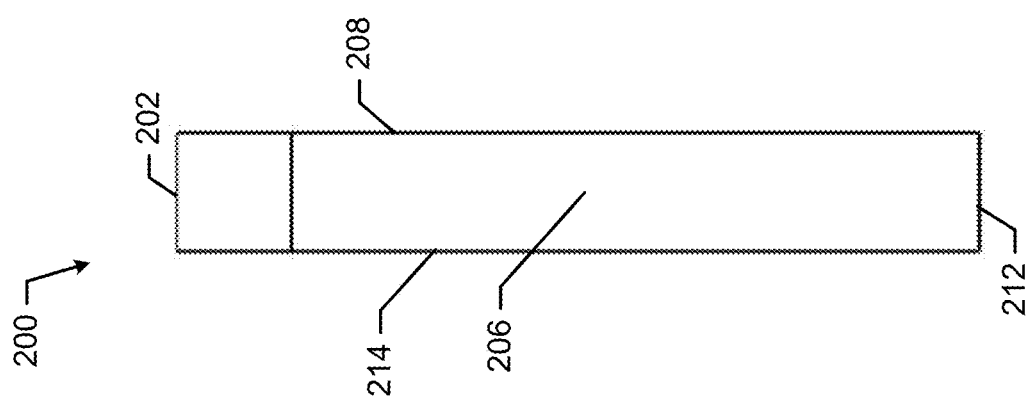
FIG. 2E illustrates a right side view of a seatback according to some example embodiments.

According to some example embodiments, an example of a seamless rebonded foam article that may be constructed in accordance with the example embodiments provided herein may be a seatback for a bus seat. In this regard, FIGS. 1A and 1B illustrate a seat 100 having such a seatback 104 according to some example embodiments. The seat 100 may comprise a floor support 108, a wall support 110, a seat base 102 and a seat back 104. The floor support 108 may extend from the seat base 102 to be affixed to the floor and may provide support for the seat 100 on an aisle side of the seat 100. The wall support 110 may be disposed on an opposite side to the floor support 108, i.e., on a window side of the seat 100, and the wall support 110 may be affixed to a window-side wall of, for example, a bus.

As mentioned above, the seatback 104 may be a seamless rebonded foam article formed in accordance with one or more example embodiments described herein. As such, the seatback 104 may be formed of rebonded foam. Rebonded foam, according to some example embodiments, may be a foam resulting from a process that involves adhering particles of foam material that are initially ground or shredded from scrap or recycled foam. Such foam, according to some example embodiments, may be a polyurethane foam. The particles of foam resulting from the grinding or shredding may be combined with adhesives or bonding agents to facilitate molding and curing of the rebonded foam during manufacture of an article. Such adhesive or bonding agents may include polyurethane prepolymers, which may comprise a polyol component, such as a polyether polyol, and an isocyanate component, such as tolylene diisocyanate or methylene diphenyl diisocyanate. In this regard, according to some example embodiments, the adhesives or bonding agents may be impregnated into the rebond foam particles. Additionally, according to some example embodiments, the rebond foam particles may also comprise a fire-retardant substance that inhibits combustion of an article formed using the rebond foam particles. In some instances, the use of rebonded foam may facilitate the production of foam articles at a lower cost through the use of foam that would otherwise be waste.

As such, the seatback 104 may be constructed using rebonded foam such that the seatback 104 is seamless (i.e., is one singular molded unit) and comprises an internal cavity. In this regard, the seat 100 may include a support frame 106 that may be comprised of metal or the like. The seatback 104 may slide onto the support frame 106 to provide stability and strength to the seatback 104, while the rebonded foam provides a degree of cushioning. As such, the support frame 106 may be slid into an internal cavity of the seatback 104 to assembly the seat 100.

FIGS. 2A to 2H illustrate more detailed views of an example seatback according to some example embodiments. Similar to the seatback 104, the seatback 200 may be formed of rebonded foam. Additionally, the seatback 200 may be a seamless rebonded foam article and may comprise an internal cavity 216. According to some example embodiments, the seatback 200 may comprise a top 202 with rounded corners from which sides 204 and 206 extend. The top 202 and the sides 204 and 206 may define a thickness of the seatback 200. The seatback 200 may also have a front 214 and a back 208. According to some example embodiments, the back 208 may comprise an inset area 210 that may be configured for use as a pocket or the like on the back 208 of the seatback 200, when the seatback 200 is part of a finished seat.

The seatback 200 may also comprise a bottom 212. An opening for the internal cavity 216 of the seatback 200 may be disposed on the bottom 212 of the seatback 200 to receive a support frame member for the seatback 200. The internal cavity 216 may be void space in the form of a pocket disposed between the front 214 and the back 208 of the seatback 200. According to some example embodiments, the internal cavity 216 may include various features to facilitate engagement with a support frame, as described above. According to some example embodiments, since the rebonded foam article may have some degree of flexibility, the internal cavity 216 may include a narrower portion that may be stretched during installation on, for example, a U-shaped tubular support frame, and permitted to return to the unstretched configuration once the seatback 200 is installed on the support frame.

Figure 3A:
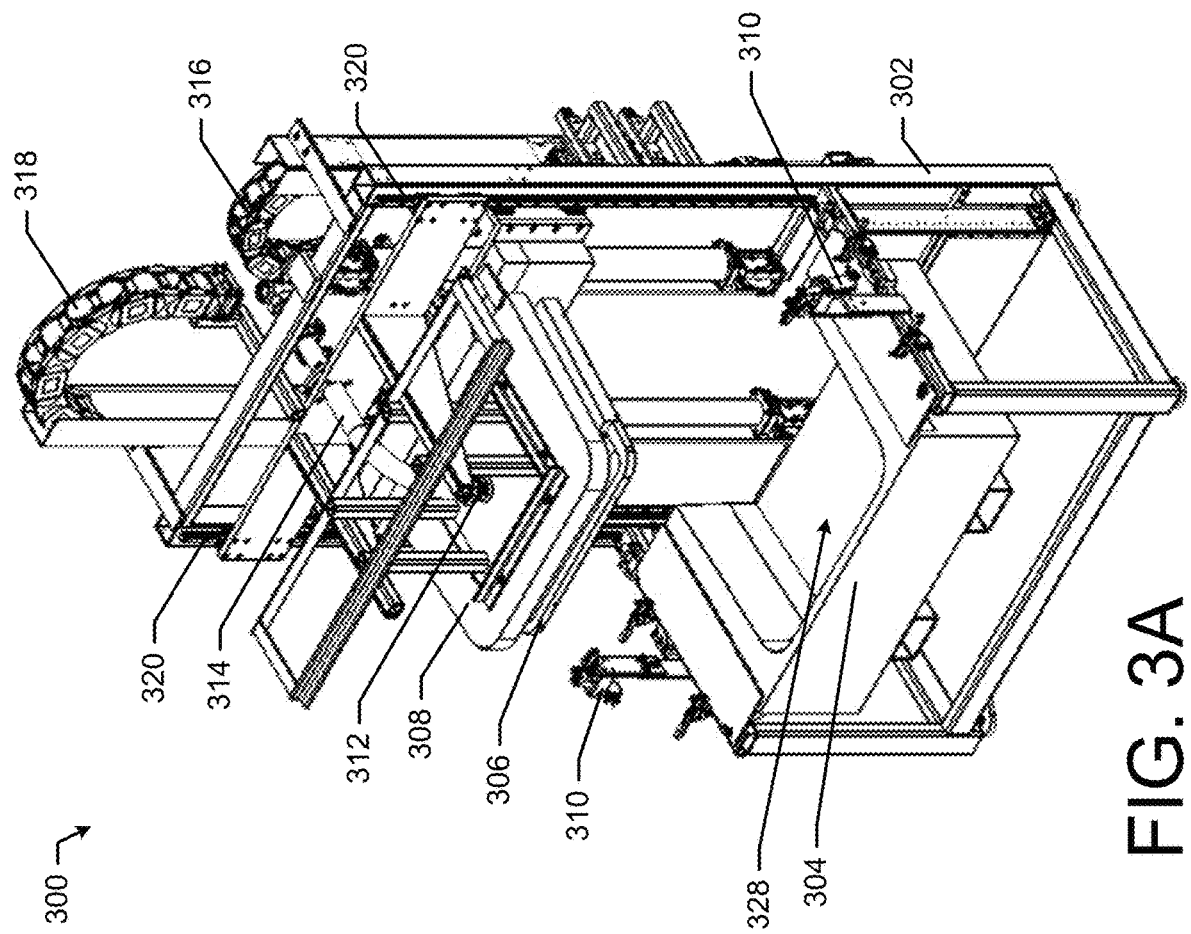
FIG. 3A illustrates a perspective front view of a rebonded foam molding machine according to some example embodiments.
Figure 3B:
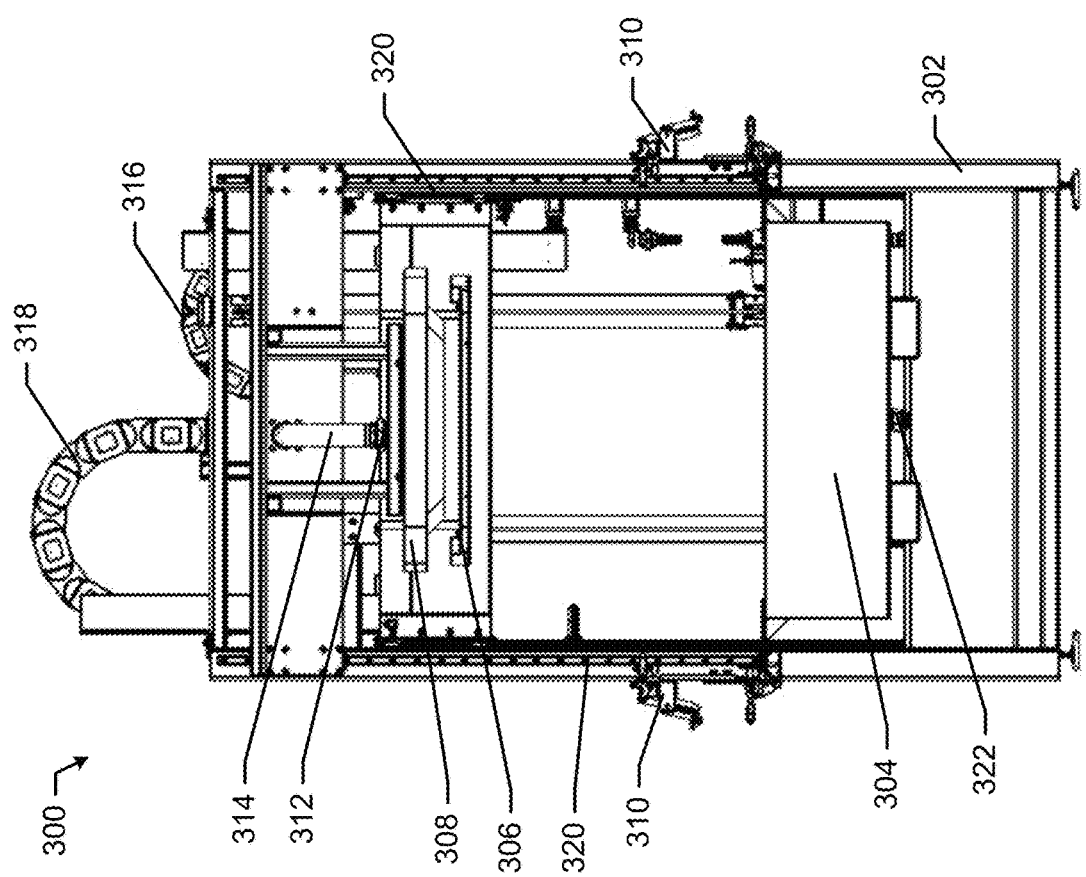
FIG. 3B illustrates a front view of a rebonded foam molding machine according to some example embodiments.
Figure 3C:
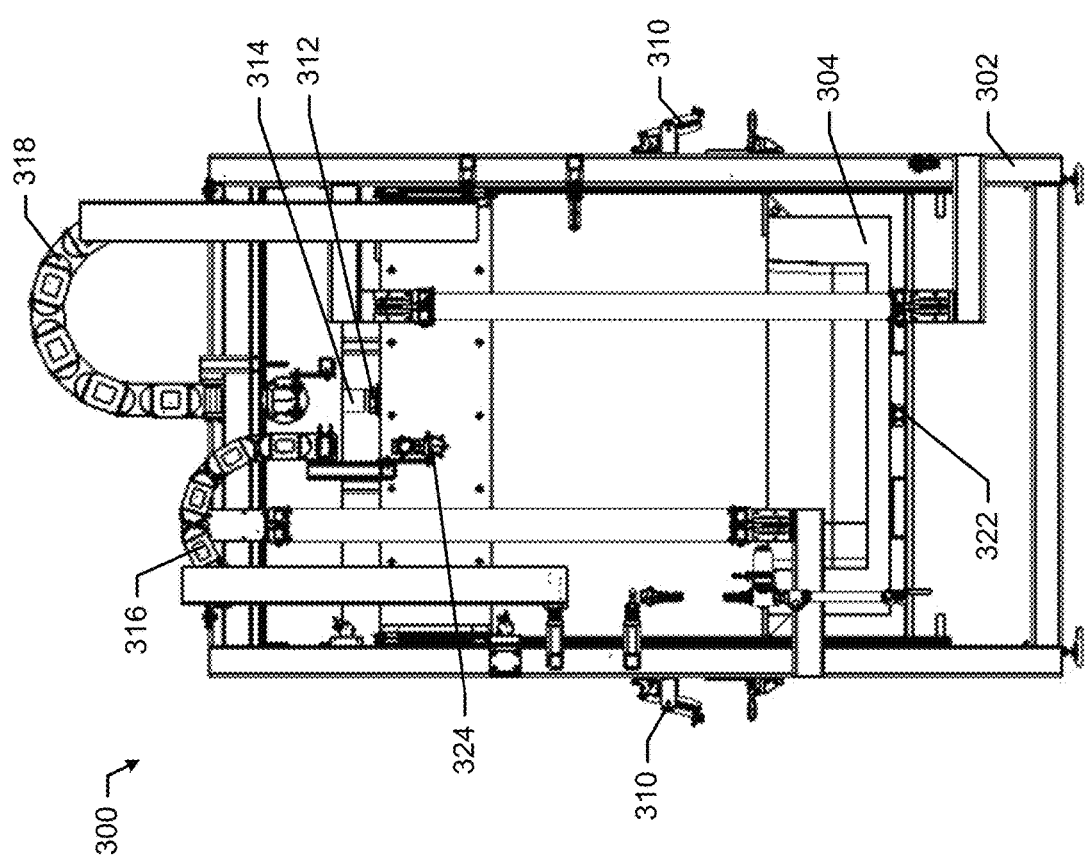
FIG. 3C illustrates a back view of a rebonded foam molding machine according to some example embodiments.

To construct a seamless rebonded foam article with an internal cavity, such as the seatback 104 or the seatback 200, a molding machine, such as the rebonded foam molding machine 300 of FIGS. 3A to 3C may be used according to some example embodiments. In this regard, to form a seamless rebonded foam article with an internal cavity, the rebonded foam molding machine 300 may comprise a bottom mold 304, a middle mold 306, and a top mold 308. The rebonded foam molding machine 300 may be configured to move the middle mold 306 and the top mold 308 into positions (e.g., form positions) within a mold cavity 328 of the bottom mold 304 for a molding process.

The rebonded foam molding machine 300 may comprise a frame 302 that provides structural support for various components of the rebonded foam molding machine 300. The frame 302 may support the bottom mold 304 via engagement with side flanges of the bottom mold 304. In this regard, according to some example embodiments, the bottom mold 304 may be held in a stationary position with the middle mold 306 and the top mold 308 being moveable relative to the stationary bottom mold 304.

The rebonded foam molding machine 300 may comprise a middle mold actuator assembly 316 and a top mold actuator assembly 318. The middle mold actuator assembly 316 may be configured to move the middle mold 306 and the top mold actuator assembly 318 may be configured to move the top mold 308. The actuator assemblies 316 and 318 may, according to some example embodiments, comprise actuator arms that are moveable via, for example, a controllable motor to cause the arm, and, in turn a mold operably coupled to the arm, to move. According to some example embodiments, the middle mold 306 and the top mold 308 may be operably coupled to side rails 320 of the rebonded foam molding machine 300, and the movement of the actuator arm may cause the respective mold to move along the side rails 320. According to some example embodiments, the motors or other components may be controllable by control circuitry via an electronic interface to communicate movement signals or instructions to cause the molds to move to specifically desired positions.

In this regard, according to some example embodiments, the middle mold actuator assembly 316 may move the middle mold 306 into a middle mold form position within the mold cavity 328 for constructing an article. The top mold actuator assembly 318 may move the top mold 308 into a top mold form position within the mold cavity 328 for constructing the article. The configuration where the top mold 308 is in the top mold form position and the middle mold 306 is in the middle mold form position, relative to the stationary bottom mold 304, may define a mold space within the mold cavity 328 that may be filled with rebonded foam, via example processes described below, for molding an article. According to some example embodiments, the rebonded foam molding machine 300 may also comprise mold clamps 310. The mold clamps 310 may be applied to a top side of the top mold 308 once the top mold 308 is disposed in the top mold form position. The mold clamps 310 may operate to apply further pressure on the top mold 308 to compress the rebond foam particles disposed in the mold space during a mold process. Additionally, mold clamps 310 may lock or secure the positioning of the top mold 308 in preparation for the injection of steam into the mold space and inhibit movement of the top mold 308, or even movement of the middle mold 306 due to the pressure applied, when steam or compressed air is injected into the mold space. According to some example embodiments, the mold clamps 310 may be manually actuated or a controllable movement mechanism may be used to engage the mold clamps 310 automatically. According to some example embodiments, the mold clamps 310 may comprise a spiral threaded member that may be turned, manually or automatically, to further extend towards the top mold 308 and apply an increased pressure on the top mold 308 that may further urge the top mold 308 downward and secure top mold 308 in the mold cavity.

In this regard, with the middle mold 306 and the top mold 308 in these positions, stream may be injected into the mold space via a middle mold fluid port interface 324. The middle mold fluid port interface 324 may comprise a port that may be operably coupled to a steam source, e.g., via a valve, to controllably introduce steam into the mold space. In this regard, the middle mold 306 may comprise at least one middle mold flow hole disposed on a mold surface of the middle mold 306, and, according to some example embodiments, a plurality of middle mold flow holes may be disposed on one or more mold surfaces of the middle mold 306. The middle mold flow holes may be fluidly connected to a port of the middle mold fluid port interface 324. The middle mold flow holes may be structured, according to some example embodiments, as small diameter holes which form passages to inject gases such as steam or compressed air into the mold space. The middle mold flow holes, according to some example embodiments, may be about 1/16" in diameter. However, the size of the middle mold flow holes may be selected based on requirements of a specific type of foam and other factors. As shown in FIG. 3C, the middle mold fluid port interface 324 may be disposed on a back side of the middle mold 306. Since the middle mold 306 may have a relatively central location within the mold space, the middle mold 306 may be an advantageous location to introduce steam into the mold space via the middle mold flow openings on the middle mold 306, which may be disposed on, for example, a top and bottom surface of the middle mold 306.

The top mold 308 may comprise a top mold fluid port interface 312 and the bottom mold 304 may comprise a bottom mold fluid port interface 322. The top mold fluid port interface 312 may comprise a port that may be fluidly coupled to at least one top mold flow hole in a mold surface of the top mold 308. The bottom mold fluid port interface 322 may comprise a port that may be fluidly coupled to at least one bottom mold flow hole in a mold surface of the bottom mold 304. The ports of the top mold fluid port interface 312, the middle mold fluid port interface 324, and the bottom mold fluid port interface 322 may be operably coupled to a pipe or other extension device to facilitate connections to the ports of the interfaces 312, 322, and 324 via the pipe or extension device. In this regard, for example, the pipe 314 may be connected to the top mold fluid port interface 312 to facilitate connection with a vacuum source on a back side of the rebonded foam molding machine 300. Similar to the middle mold flow holes, the top mold flow holes and the bottom mold flow holes may be structured, according to some example embodiments, as small diameter holes which form passages to evacuate gases such as steam or compressed air from the mold space. The top mold flow holes and the bottom mold flow holes, according to some example embodiments, may be about 1/16" in diameter. However, the size of the top mold flow holes and the bottom mold flow holes may be selected based on requirements of a specific type of foam and other factors.

In this regard, the top mold fluid port interface 312 and the bottom mold fluid port interface 322 may be operably coupled to a vacuum source. As such, via the top mold flow holes and the bottom mold flow holes, steam, for example, may be evacuated from the mold space through controlled connection with a vacuum source. In this regard, by injecting steam into the middle mold fluid port interface 324 and extracting steam via the top mold fluid port interface 312 and the bottom mold fluid port interface 322, steam dispersion paths may occur within the mold space to move steam through the rebond foam particles disposed within mold space. Since the steam may activate an adhesive of the rebond foam particles, the steam dispersion paths may facilitate substantially even and efficient steam dispersion through the mold space to cause uniform curing of the rebond foam particles and faster cure times. The middle mold fluid port interface 324 may also be operably coupled to a compressed air source that is controllable to provide comprised air into the mold space to assist in a final evacuation of residual steam from the mold space after curing is complete. In this regard, the top mold 308 and the bottom mold 304 may continue to be operably coupled to a vacuum source to pull residual steam and moisture from the mold space while compressed air is being injected.

Figure 4A:
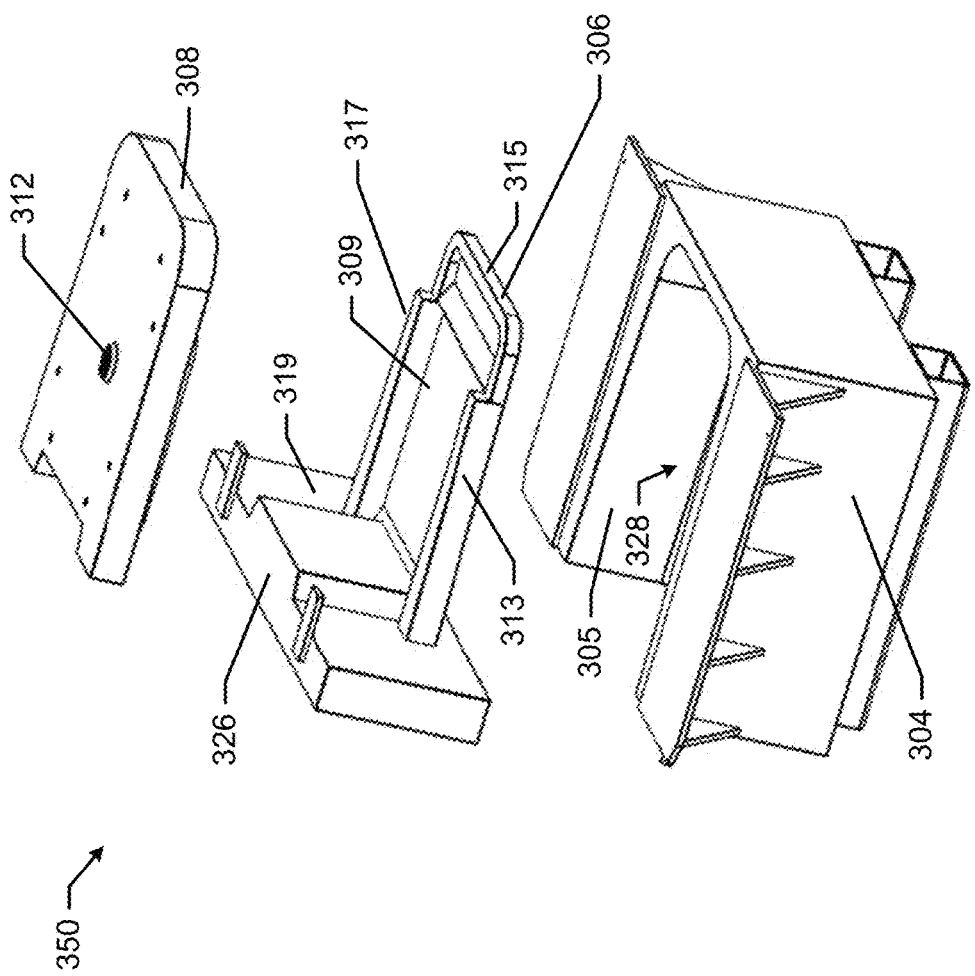
FIG. 4A illustrates perspective side view of a mold assembly in isolation according to some example embodiments.
Figure 4B:
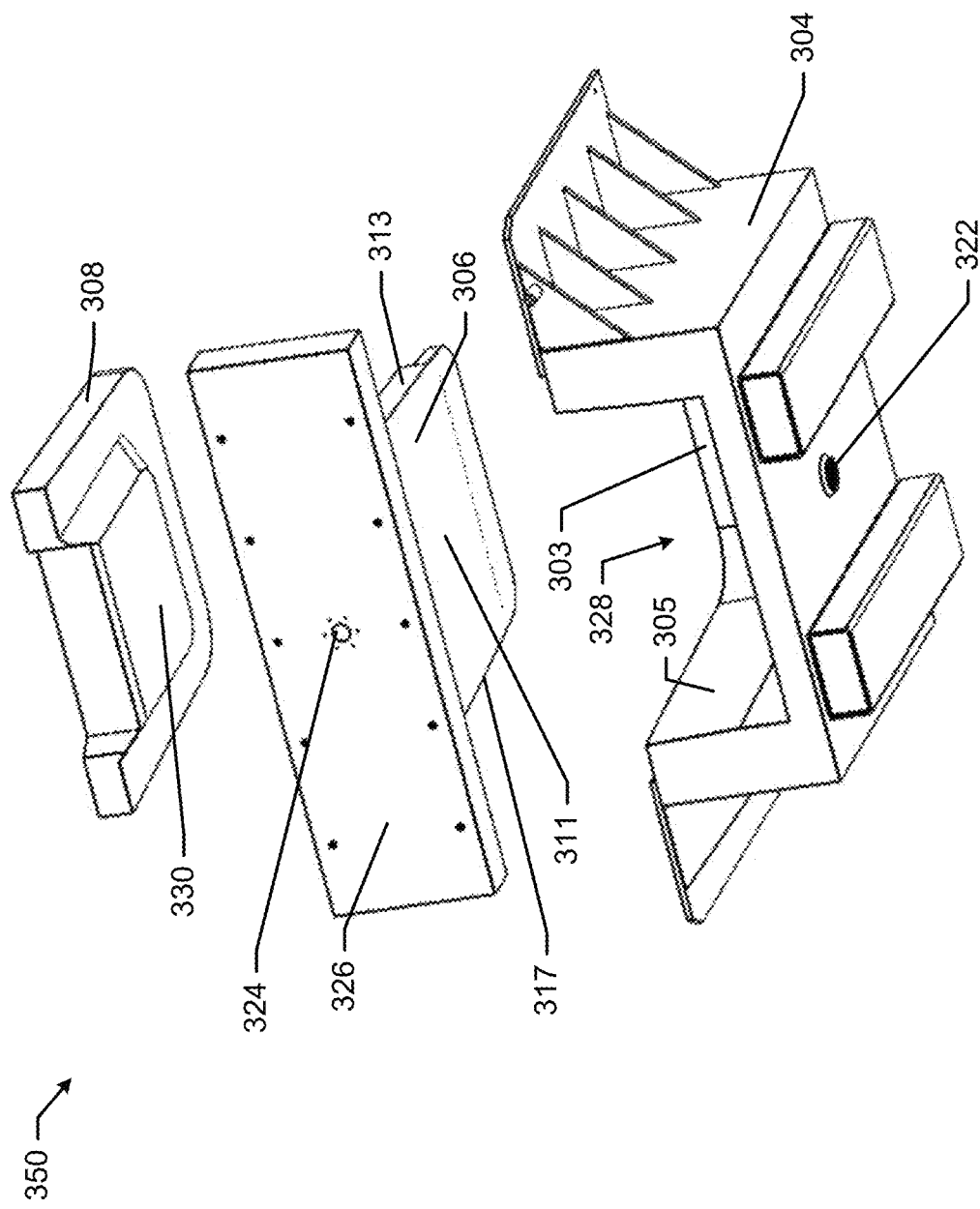
FIG. 4B illustrates perspective back view of a mold assembly in isolation according to some example embodiments.
Figure 4C:
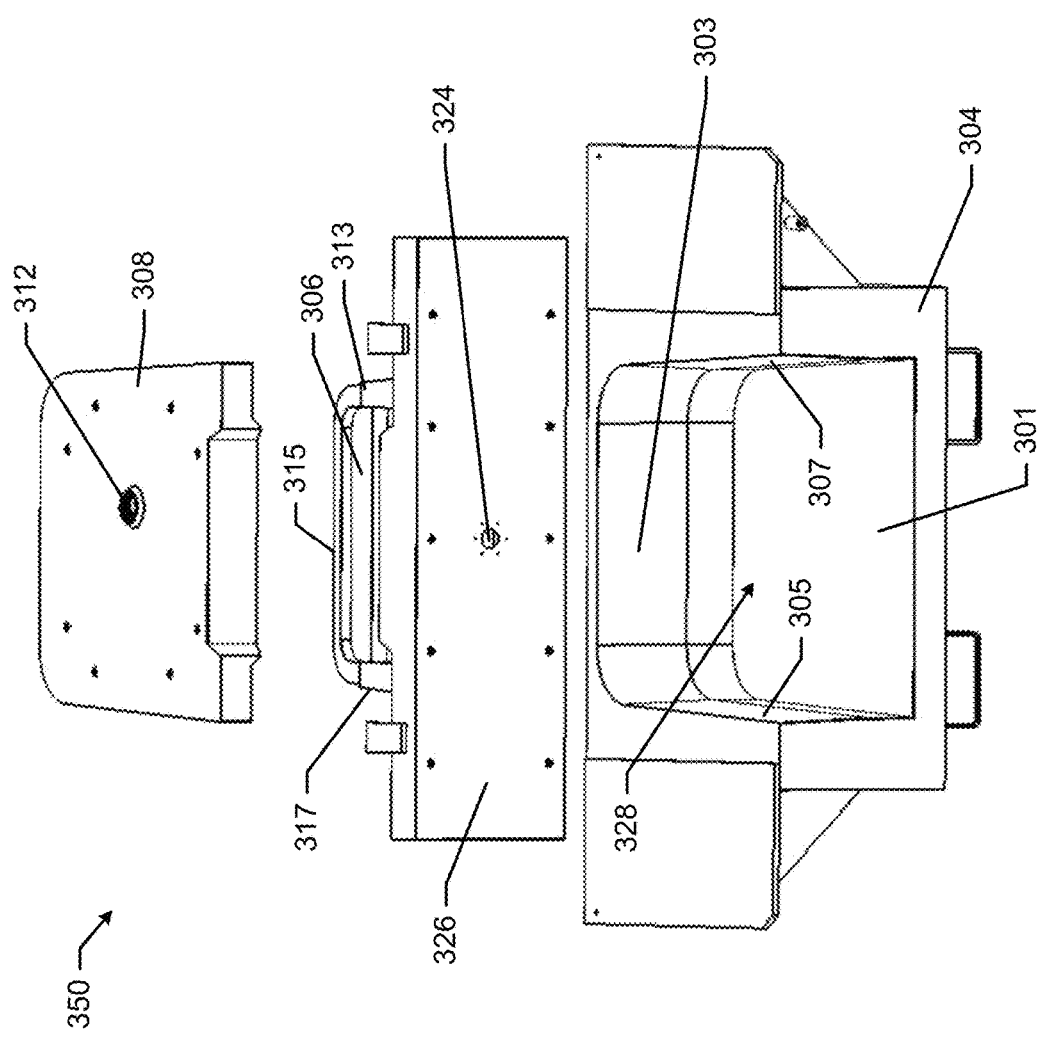
FIG. 4C illustrates another perspective back view of a mold assembly in isolation according to some example embodiments.
Figure 4D:
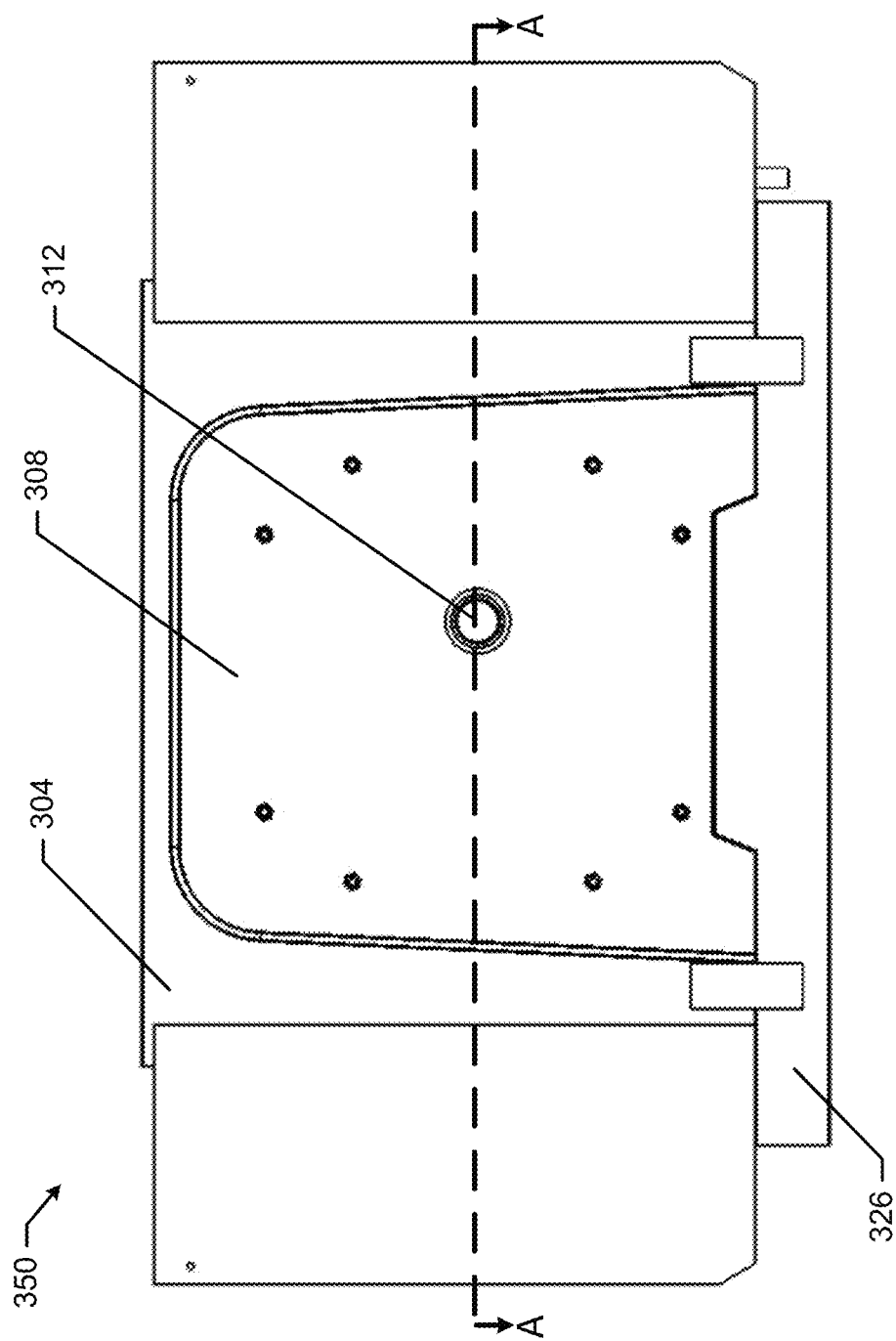
FIG. 4D illustrates top view of a mold assembly in isolation and defining a cross-section A-A according to some example embodiments.

FIGS. 4A to 4E provide a more detailed view of the top mold 308, the middle mold 306, and the bottom mold 304, as a mold assembly 350, in isolation from other components of the rebonded foam molding machine 300. In particular, the mold surfaces, i.e., the surfaces of the molds that come into contact with rebond foam particles during the molding process, are more clearly shown. As further described below, any of the mold surfaces may be candidate locations for the positioning of flow holes (not shown in FIGS. 4A to 4E) to circulate steam through the mold space during a molding process according to some example embodiments. In this regard, FIG. 4A illustrates a perspective side view of the mold assembly 350; FIG. 4B illustrates a perspective rear view of the mold assembly 350; FIG. 4C illustrates another perspective rear view of the mold assembly 350; FIG. 4D illustrates a top view of the mold assembly 350; and FIG. 4E illustrates a cross-section view of the mold assembly 350 taken at A-A as shown in FIG. 4D. Note that due to the cross-section view of FIG. 4E, a front of the bottom mold 304, as well as other portions of the molds, have been removed from view.

In this regard, top mold 308 is shown with the top mold fluid port interface 312 and a mold surface 330 disposed on a bottom side of the top mold 530. The mold surface 330 may comprise a protrusion that creates the inset area 210 of the seatback 200. The top mold 308 may have a perimeter shape that is substantially similar to a perimeter shape of the mold cavity 328, and may therefore operate as a cap for the mold cavity 328 during a molding process.

The bottom mold 304 may comprise a bottom mold fluid port interface 322 and a plurality of mold surfaces. The plurality of mold surfaces of the bottom mold 540 may include a base surface 301, side surfaces 305 and 307, and a front surface 303. The base surface 301, the side surfaces 305 and 307, and the front surface 303 may define sides of a mold cavity 328 in the bottom mold 540. As described above, the top mold 530 may operate as a top or cap on the mold cavity 328 to define the mold space resulting when the molds are in their respective form positions. A back side of the mold cavity 328 is also open. However, the middle mold 535 extends from a back wall 326, and when the middle mold 535 moves into the middle mold form position, the back wall 326 may close the back side opening of the mold cavity 328 to further define the mold space.

Accordingly, the middle mold 306 may extend from the back wall 326, which comprises a mold surface 319. Additionally, since the middle mold 535 protrudes into the mold space, the middle mold 535 may comprise a plurality of mold surfaces. In this regard, the middle mold 535 may comprise a mold surface 309 on a top of the middle mold 535, a mold surface 315 on a front of the middle mold 535, mold surfaces 313 and 317 on sides of the middle mold 535, and a mold surface 311 on a bottom of the middle mold 535. Additionally, the back wall 326 may comprise a mold surface 319 disposed on an inner surface of the back wall 326.

Figure 5A:
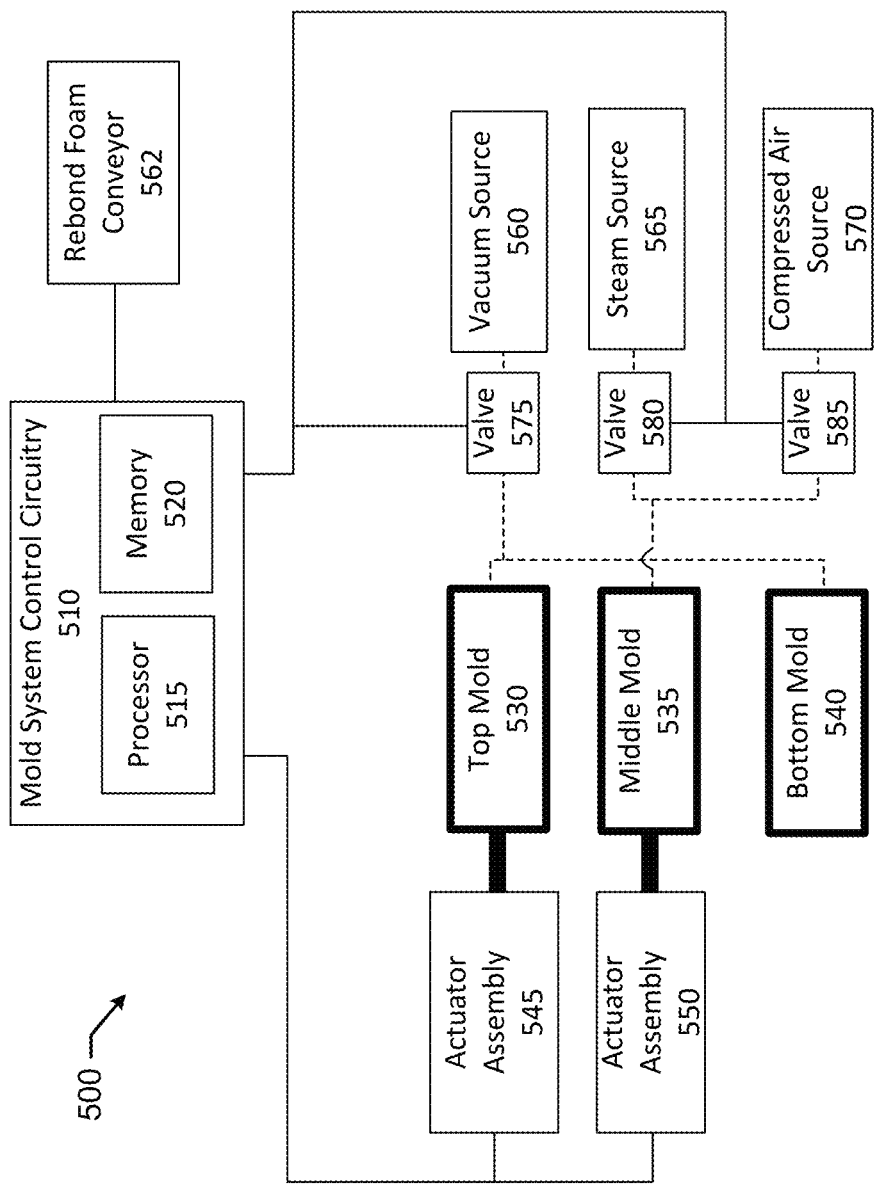
FIG. 5A illustrates a block diagram of a mold system according to some example embodiments.

Now referring to FIG. 5A, a block diagram of a mold system 500 according to some example embodiments is provided. The mold system 500 may comprise components of the rebonded foam molding machine 300 and other components that may operate to support the operation of the rebonded foam molding machine 300. In this regard, the mold system 500 may comprise a top mold 530, a middle mold 535, and a bottom mold 540, which may be same or similar to the top mold 308, the middle mold 306, and the bottom mold 304, respectively.

As mentioned above, the top mold 530 may be mechanically coupled to an actuator assembly 545, which may be configured to move the top mold 530. The actuator assembly 545 may be structured and function similar to the actuator assembly 318. Similarly, the middle mold 535 may be mechanically coupled to an actuator assembly 550, which may be configured to move the middle mold 535. The actuator assembly 550 may be structured and function similar to the actuator assembly 316. Further, the top mold 530 may be fluidly connected to a valve 575 that may be operably coupled to a vacuum source 560 (e.g., a vacuum device). The bottom mold 304 may be fluidly connected to the valve 575 that may be operably coupled to a vacuum source 560 (e.g., a vacuum device). In this regard, while the example embodiment of the mold system 500 shows that top mold 530 and the bottom mold 304 share a valve 575, in some example embodiments, the top mold 530 and the bottom mold 304 may have separate, dedicated valves. Further, according to some example embodiments, the vacuum provided via the fluid connection between the vacuum source 560 and the top mold 530 and bottom mold 304 may be controlled via direct control of the vacuum source 560, without the need for an intervening valve, such as valve 575.

The middle mold 535 may be fluidly connected to the steam source 565 and the compressed air source 570. The steam source 565 may comprise a boiler or another device that generates steam for delivery to the middle mold 535. The compressed air source 570 may be an air compressor or another device that generates compressed air for delivery to the middle mold 535. In this regard, the flow of steam may be controlled via direct control of the operation of the steam source 565 or via control of the valve 580 connected between the steam source 565 and the middle mold 535. The flow of compressed air may be controlled via direct control of the operation of the compressed air source 570 or via control of the valve 585 connected between the compressed air source 570 and the middle mold 535.

According to some example embodiments, the mold system 500 may also comprise a rebond foam conveyor 562. The rebond foam conveyor 562 may be configured to deliver rebond foam particles from a storage space and into the mold cavity 328. In this regard, the rebond foam conveyor 562 may be controllable to deliver a desired amount of rebond foam particles to the mold cavity 328 at a specific time in the molding process. The rebond foam conveyor 562 may comprise a weight sensor to determine an amount of rebond foam particles that are being delivered to the mold cavity 328. Additionally, the rebond foam conveyor 562 may actuate and move to distribute the rebond foam particles at desired locations within the mold cavity 328 to, for example, evenly distribute rebond foam particles across an area of the mold cavity 328.

Additionally, the mold system 500 may comprise mold system control circuitry 510. The mold system control circuitry 510 may be configured to control operation of the mold system 500 including the actuator assembly 545, the actuator assembly 550, the valve 575, the valve 580, and the valve 585. As mentioned above, the mold system control circuitry 510 may be configured to directly control the vacuum source 560, the steam source 565, or the compressed air source 570, thereby avoiding, in some example embodiments, the need for a respective valve. Additionally, according to some example embodiments, the mold system control circuitry 510 may be configured to control operation of the rebond foam conveyor 562 to load rebond foam particles into a mold cavity of the bottom mold 540 in desired amounts and at desired times.

The mold system control circuitry 510 may comprise a processor 515 and a memory 520. According to some example embodiments, the processor 515 and the memory 520 may be configurable via the execution of software instructions stored, for example, on the memory 520 to provide control output signals to desired components to control the operation of the components based on the software instructions. According to some example embodiments, the processor 515 and the memory 520 may be configured to perform the functionalities described herein by being a hardware configured device in the form of, for example, a field programmable gate array (FPGA) or an application specific integrated circuit (ASIC). The memory 520 may be utilized to store settings and historical information regarding a specific a molding process.

Figure 5B:
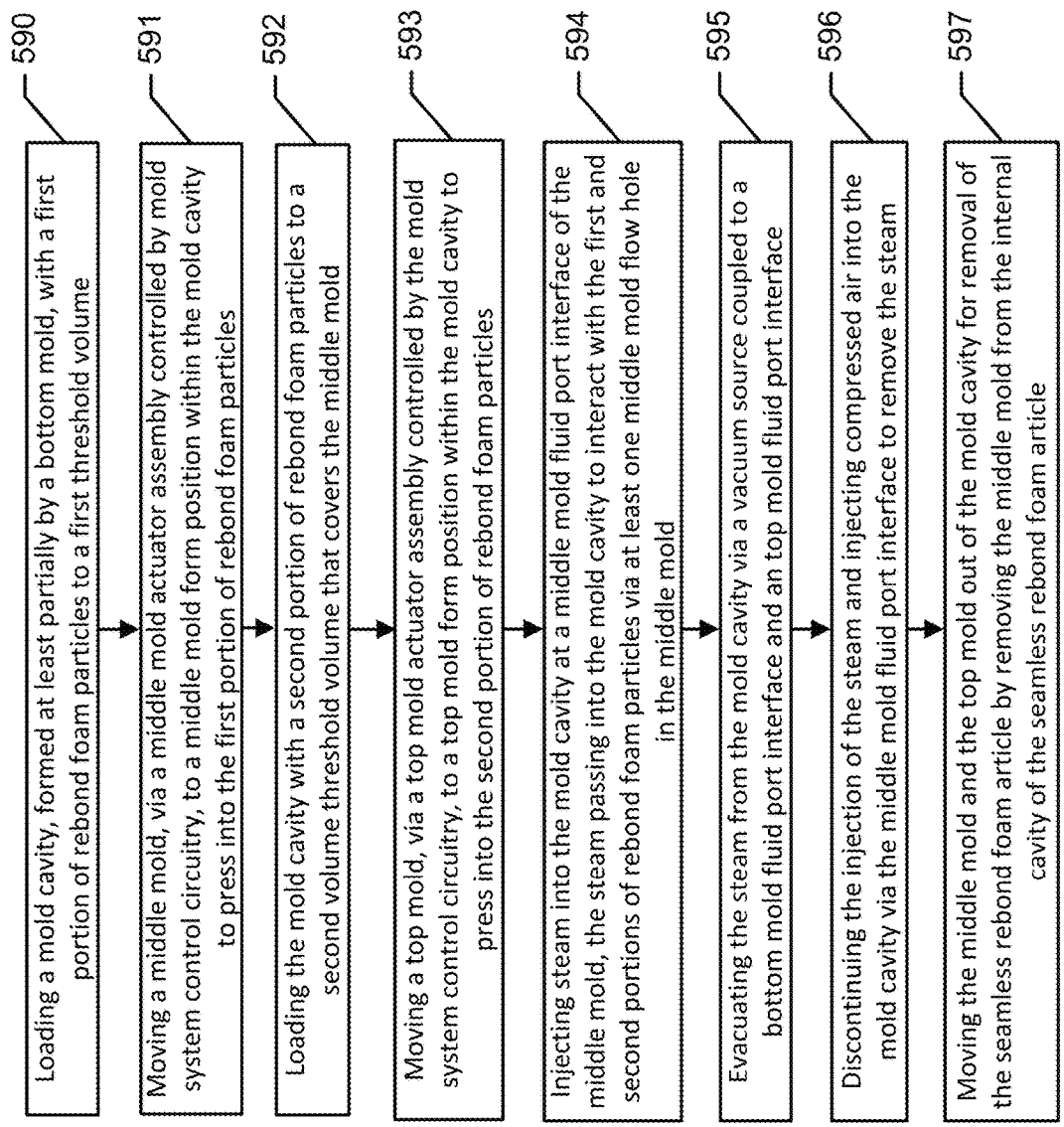
FIG. 5B illustrates a flowchart of an example method for constructing a seamless rebonded foam article with an internal cavity according to some example embodiments.

Within the context of the mold system 500, an example method for constructing a seamless rebonded foam article, such as the seatback 200, is provided in association with the flowchart of FIG. 5B. As indicated herein, some or all of the operations described in association with the example method associated with FIG. 5B may be controlled by the mold system control circuitry 510. Additionally, the example method of FIG. 5B will also be described in association with FIGS. 6A to 6J, which illustrate operational states of the molds during some of the operations described in the flowchart of FIG. 5B.

In this regard, FIGS. 6A to 6J illustrate a cross-section view of a mold assembly 600. The mold assembly 600 may comprise the top mold 530, the middle mold 535, and the bottom mold 540. According to some example embodiments, the top mold 530 may be same or similar to the top mold 308, the middle mold 535 may be the same or similar to the middle mold 306, and the bottom mold 540 may be same or similar to the bottom mold 304. Due to the cross-sectional view provided in FIGS. 6A to 6J, the front mold surface of the bottom mold 540 is not shown and the back mold surface of a back wall coupled to the middle mold 535 is not shown. However, based on the description provided above, one of ordinary skill in art would appreciate that the operational states shown in FIGS. 6A to 6J would include such front and back mold surfaces to define the mold space.

As described above, the top mold 530 may comprise a top mold fluid port interface 532 and top mold flow holes 534 disposed on the mold surface of the top mold 530 (i.e., a bottom surface of the top mold 530). Similarly, the middle mold 535 may comprise a middle mold fluid port interface 536 and middle mold flow holes 538 on some or all of the mold surfaces of the middle mold 535. In this regard, since the middle mold 535 has a smaller width and height than the top mold 530 or the bottom mold 540 to form an internal cavity of a seamless rebonded foam article, the middle mold 535 may be surrounded by the mold space formed by top mold 530 and the bottom mold 540. Therefore, the middle mold 535 may have middle mold flow holes 538 on any of the mold surfaces that come into contact with rebond foam particles (i.e., the top surface, the bottom surface, and the side surfaces of the middle mold 535). Note that the middle mold fluid port interface 536 may be disposed on a back wall (e.g., back wall 326), and, although not shown, flow holes may be disposed on the mold surface of the back wall in some example embodiments. It is further noted that the indication of the middle mold fluid port interface 536 as shown in FIGS. 6A to 6J may be a component of the middle mold fluid port interface 536 or may be disposed on an external side of a back wall that is coupled to the middle mold 535 but not in view. Additionally, the bottom mold 540 may comprise interior walls that define a mold cavity 546, a bottom mold fluid port interface 542, and bottom mold flow holes 552. According to some example embodiments, the bottom mold flow holes 552 may be disposed on any of the mold surfaces of the bottom mold 540, however, as shown in FIGS. 6A to 6J, bottom mold flow holes 552 are only shown on a base surface of the bottom mold 540. Additionally, the mold assembly 600 may also comprise mold clamps 544, which may be structured and operate in the same or similar to the mold clamps 310 described above. While FIGS. 6A to 6J show the mold clamps 544 supported by the bottom mold 540, it is understood that the mold clamps 544 may alternatively be supported by, for example, a frame of a rebonded foam molding machine similar to mold clamps 310.

Figure 6A:
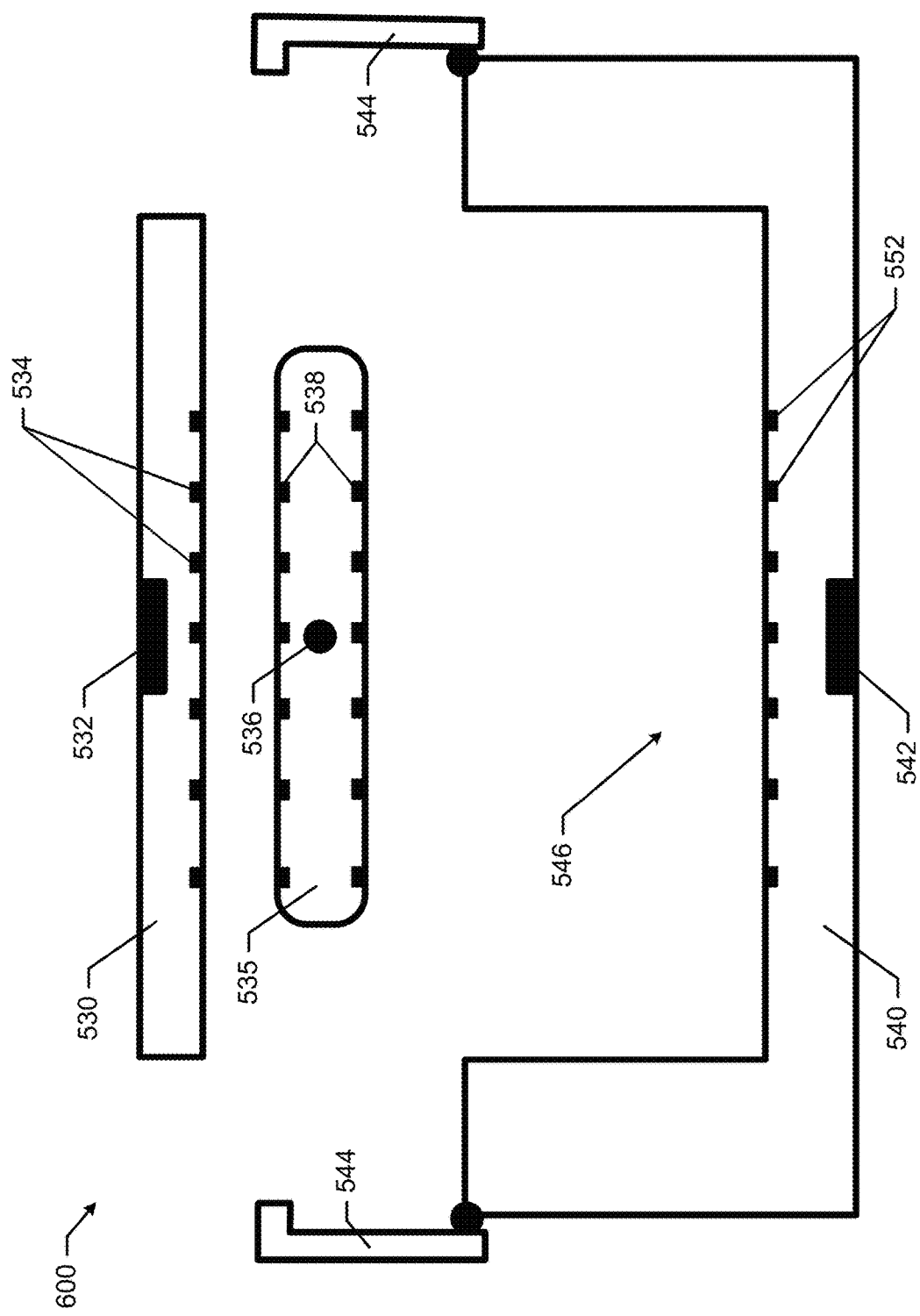
Figure 6B:
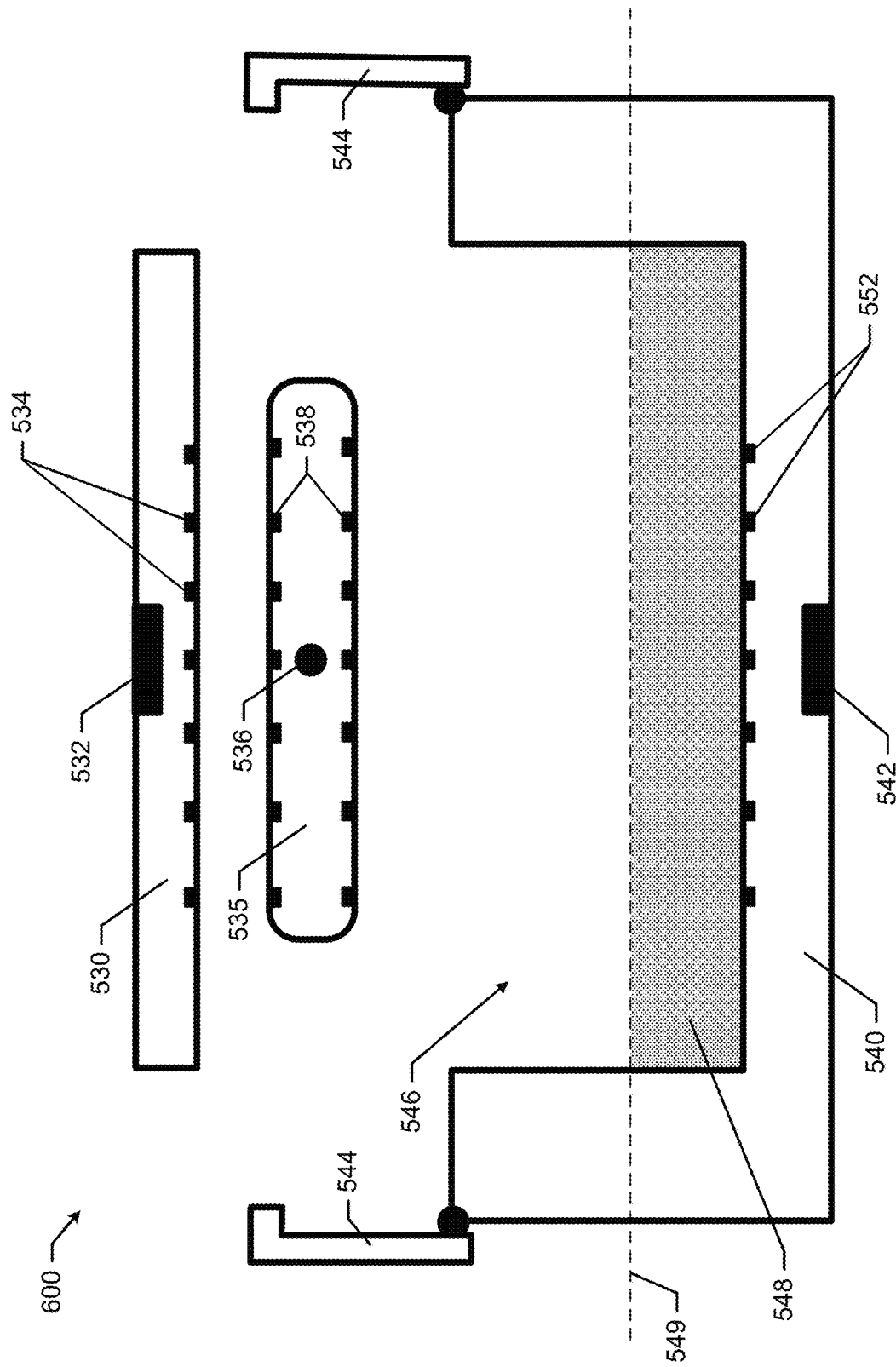

In this regard, within the context of the mold system 500 and the mold assembly 600, an example method may be performed that is based on the structural attributes of the mold system 500 and the mold assembly 600. As such, an example method for molding a seamless rebonded foam article with an internal cavity may commence, as shown in FIG. 6A with the mold cavity 546 empty, the middle mold 535 positioned out of the mold cavity 546, and the top mold 530 positioned out of the mold cavity 546. Additionally, the mold clamps 544 may be disengaged. Now referring to FIG. 6B, the example method may comprise loading the mold cavity 546, formed at least partially by a bottom mold 540, with a first portion of rebond foam particles 548 to a first threshold volume 549, as provided at 590 of FIG. 5B. According to some example embodiments, the first portion of rebond foam particles 548 may be loaded into the mold cavity 546 manually, or the mold system control circuitry 510 may control the rebond foam conveyor 562 to release a desired volume (e.g., as indicated by weight) of rebond foam particles into the mold cavity 546. As described above, the rebond foam particles may comprise repurposed, ground or shredded foam particles. According to some example embodiments, the rebond foam particles may be formed of polyurethane foam having a particle size between ⅛" to ½" or ⅛" to ¼" in diameter. Further, the rebond foam particles may comprise an adhesive that can be activated, for example, via interaction with steam. Additionally, according to some example embodiments, the rebond foam particles may comprise a fire-retardant substance that inhibits the combustion of the rebond foam particles after being cured.

Figure 6C:
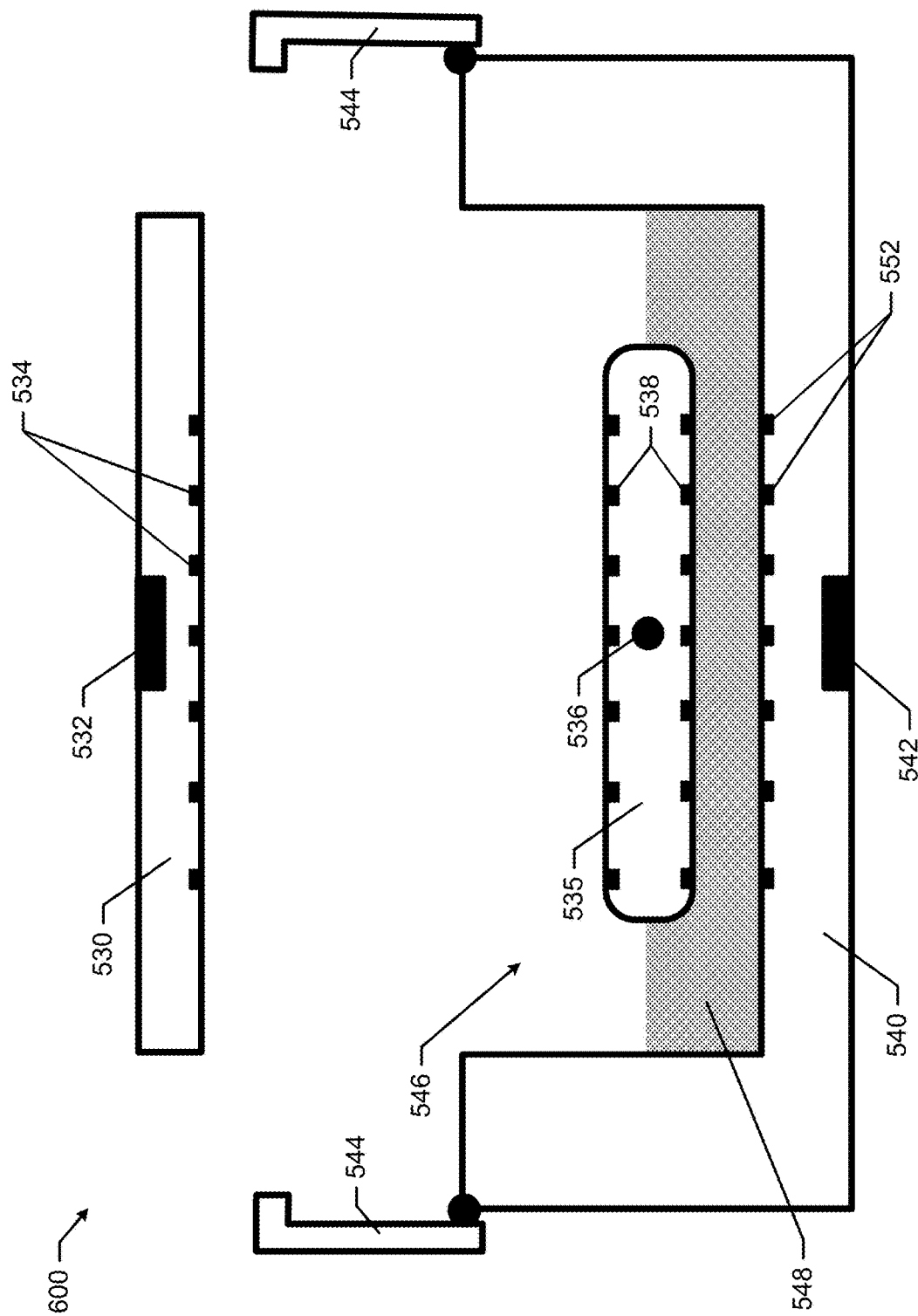

After the first portion of rebond foam particles 548 is loaded into the mold cavity 546, the example method may comprise, at 591, moving the middle mold 535, via a middle mold actuator assembly 550 controlled by mold system control circuitry 510, to a middle mold form position, as shown in FIG. 6C. The middle mold form position may be within the mold cavity 546 to press into, and apply pressure to, the first portion of rebond foam particles 548. In this regard, it can be seen in FIG. 6C that the width of the middle mold 535 may be less than a width of the mold cavity 546, and therefore some of the first portion of rebond foam particles 548 may be disposed on the sides of the middle mold 535 after being moved in the middle mold form position. According to some example embodiments, the mold system control circuitry 510 may be configured to control the actuator assembly 550 to move the middle mold 535 into the middle mold form position automatically after the first portion of rebond foam particles 548 is loaded (e.g., via the rebond foam conveyor 562).

Figure 6D:
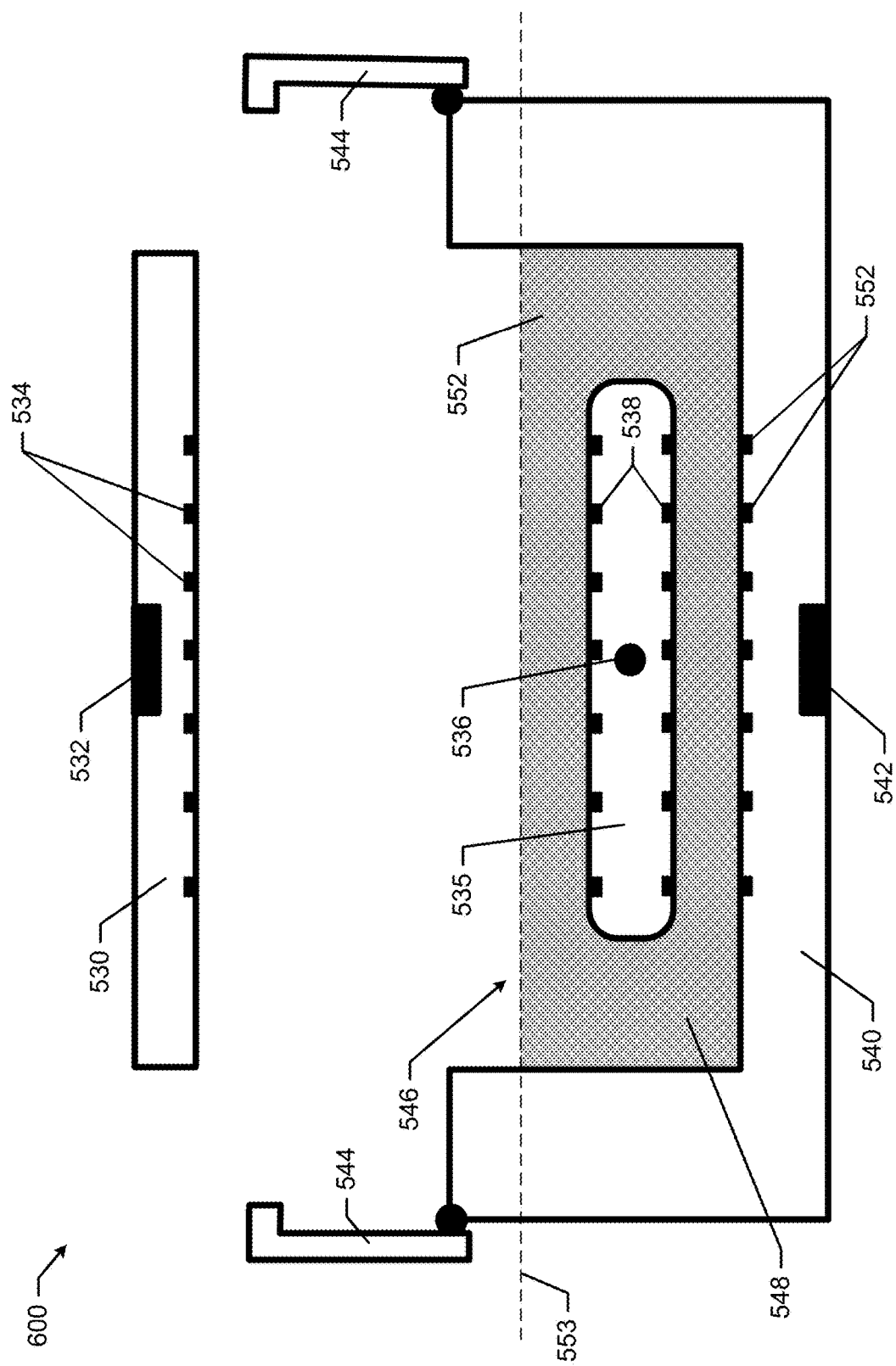

After the middle mold 535 is moved into the middle mold form position, the example method may comprise, at 592, loading the mold cavity 546 with a second portion of rebond foam particles 552 to a second volume threshold 553 that covers the middle mold 535 as shown in FIG. 6D. According to some example embodiments, the second portion of rebond foam particles 552 may be loaded into the mold cavity 546 manually, or the mold system control circuitry 510 may control the rebond foam conveyor 562 to release a desired volume (e.g., as indicated by weight) of rebond foam particles into the mold cavity 546.

Figure 6E:
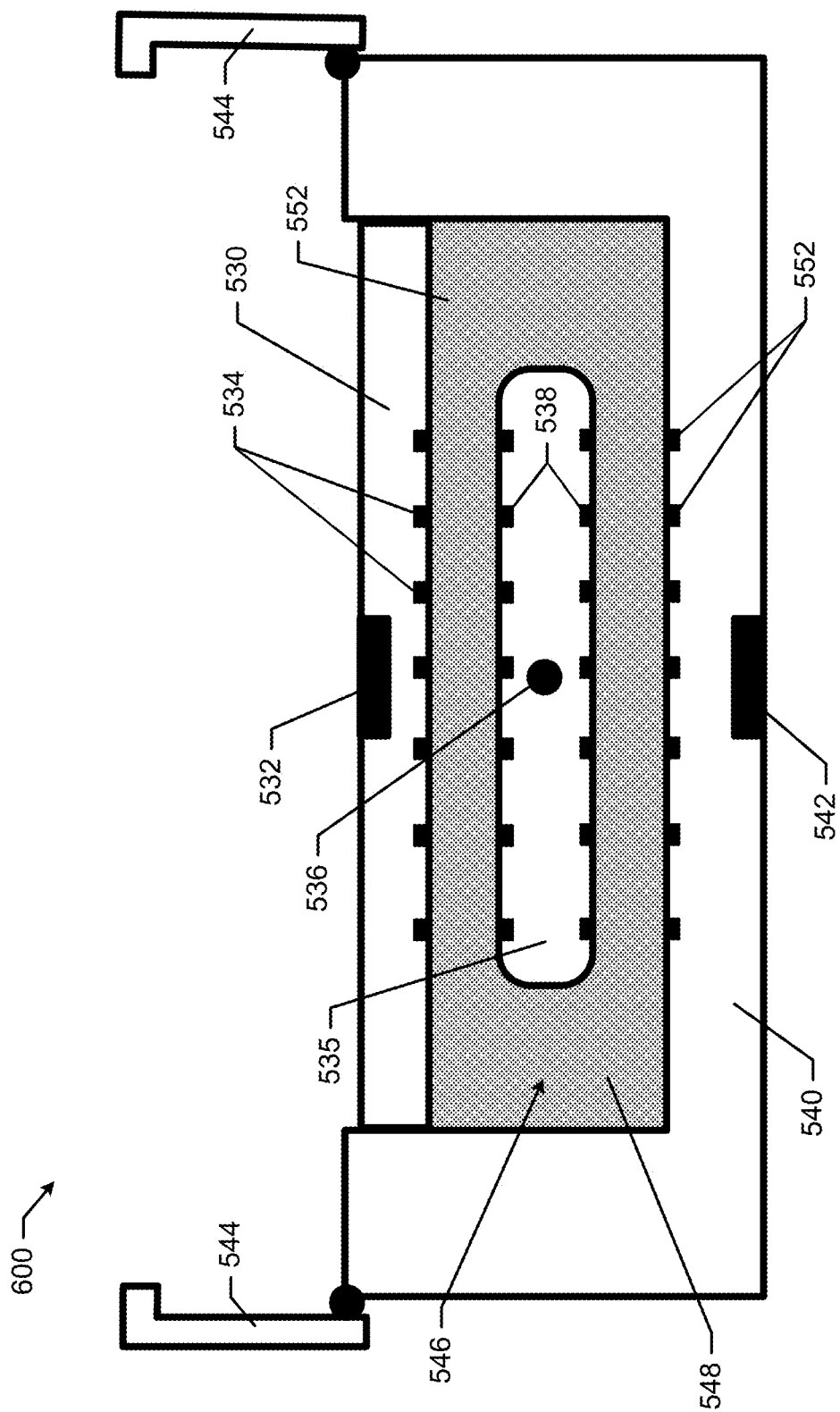

After loading the second portion of rebond foam particles 552 into the mold cavity 546, the example method may comprise, at 592, moving the top mold 530, via the top mold actuator assembly 545 controlled by the mold system control circuitry 510, to a top mold form position within the mold cavity 546 to press into the second portion of rebond foam particles 552 as shown in FIG. 6E. As mentioned above, the top mold 530 may have a complementary shape to mold cavity 546 to form a top or cap and therefore pressure applied by the top mold 530 may compress the first and second portions of rebond foam particles within the mold space formed by the bottom mold 540 and the top mold 530.

Figure 6F:
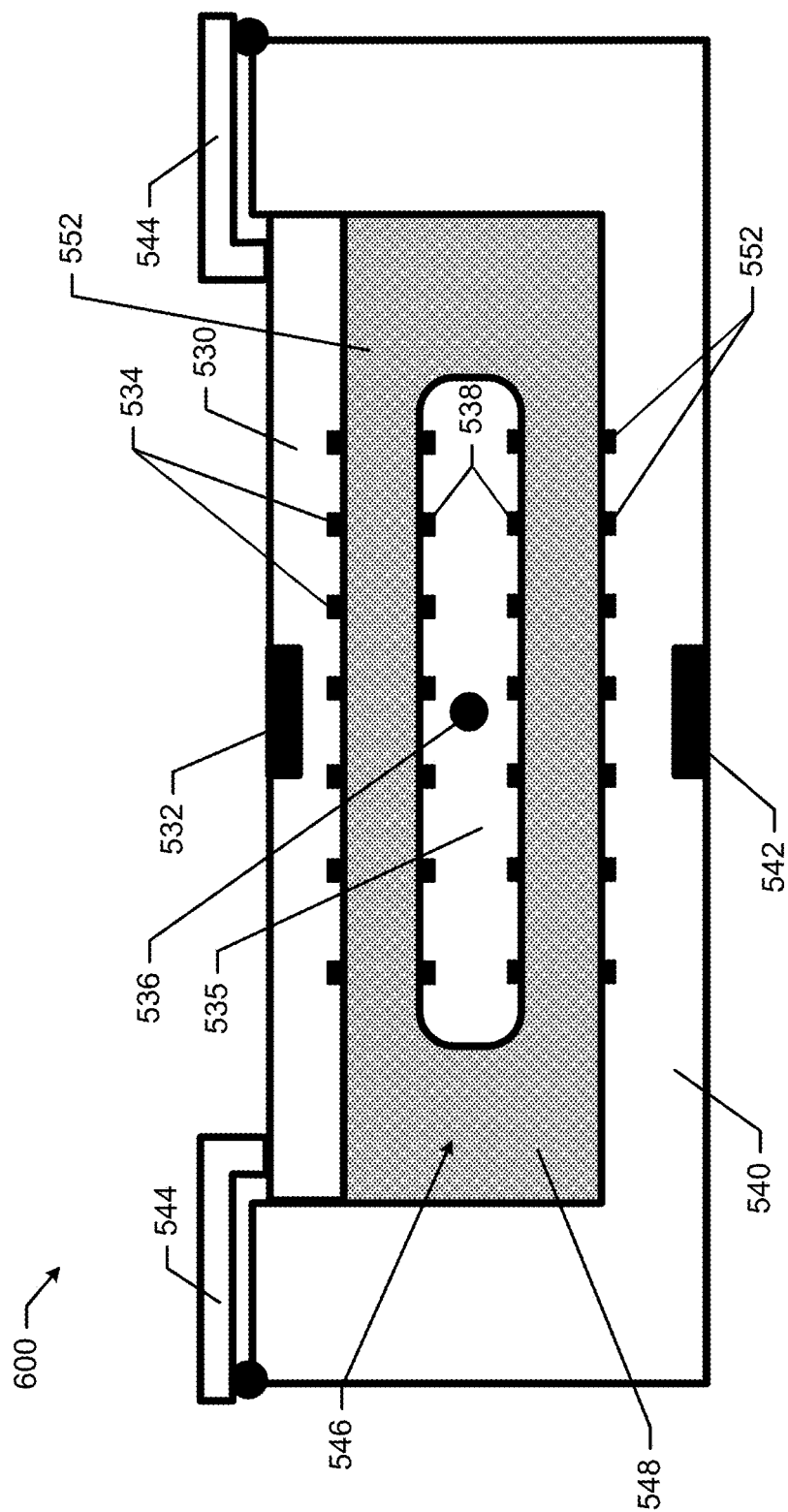

Subsequently, as shown in FIG. 6F, the example method may comprise, according to some example embodiments, clamping the top mold 530 into the mold cavity 546 via a plurality of mold clamps 544. The mold clamps 544 may be actuated to increase compression on the first and second portions of the rebond foam particles 548 and 552 by applying further pressure on the top mold 530 in a direction into the mold cavity 546. The mold clamps 544 may also secure the positioning of the top mold 530 and the middle mold 535 for steam injection. According to some example embodiments, the mold clamps 544 may be operated manually, or a controllable movement mechanism may be implemented that may be used to engage the mold clamps 544 with the top mold 530 automatically under control from the mold system control circuitry 510.

Subsequently, the example method may comprise, at 594, injecting steam 554 into the mold cavity 546 at a middle mold fluid port interface 536 of the middle mold 535, as shown in FIG. 6G. The steam 554 may pass into the mold cavity 546 to interact with the first and second portions of rebond foam particles 548 and 552 via at least one middle mold flow hole 538 in the middle mold 535. The mold system control circuitry 510 may be configured to control operation of the steam source 565 or control operation of the valve 580 (e.g., open the valve 580) to controllably inject steam 554 into the mold space within the mold cavity 546. In this regard, because the middle mold flow holes 538 may be fluidly coupled to the middle mold fluid port interface 536, steam injected via a port of the middle mold fluid port interface 536 may be forced into the mold space and into the rebond foam particles disposed therein. According to some example embodiments, the steam 554 may be introduced into the mold space at a pressure of about 5 to 30 psi or about 15 to 20 psi. A temperature of the steam 554, according to some example embodiments, may be between about 212° to 350° Fahrenheit, between about 300° to 350° Fahrenheit, or in some example embodiments about 320° Fahrenheit. As mentioned above and clearly shown in FIG. 6G, the relatively central location of the middle mold 535 within the mold space facilitates improved circulation of steam within the mold space due to its interior location. As mentioned above, the rebond foam particles may comprise an adhesive that is activated by the steam 554 to begin curing process and unify the rebond foam particles into a molded article.

At 595, the example method may further comprise evacuating the steam 554 from the mold cavity 546 via the vacuum source 560 coupled to the bottom mold fluid port interface 542 and the top mold fluid port interface 532, as also shown in FIG. 6G. In this regard, the bottom mold fluid port interface 542 may be fluidly coupled to the mold cavity 546 via at least one bottom mold flow hole 552 in the bottom mold 540 and the top mold fluid port interface 532 may be fluidly coupled to the mold cavity 546 via at least one top mold flow hole 534 in the top mold 530. As shown in FIG. 6G, the steam 554 may be evacuated via the top mold fluid port interface 532 as steam 556 and via the bottom mold fluid port interface 542 as steam 558. To evacuate the steam 554 from the mold cavity 546 and the mold space, the mold system control circuitry 510 may control the vacuum source 560 or the mold system control circuitry 510 may control the valve 575 disposed between the vacuum source 560 and the top mold fluid port interface 532 and the bottom mold fluid port interface 542 to create a low pressure at the top mold flow holes 534 and the bottom mold flow holes 552 to draw the steam 554 through these flow holes. Accordingly, the steam source 565 may force steam 554 into the mold cavity 546 and the mold space via the middle mold flow holes 538 at a relatively high pressure, and the vacuum source 560 may cause the injected steam 554 to be extracted from the mold cavity 546 and the mold space via the top mold flow holes 534 and the bottom mold flow holes 552 by creating a relatively low pressure. Again due to the placement of the middle mold 535 within the mold space and the mold cavity 546, the steam 554 introduced via the middle mold 535 may travel a relatively short distance to arrive at the top mold flow holes 534 and the bottom mold flow holes 552 for extraction. Additionally, the steam 554 may be injected such that the steam 554 radiates from an interior location to an exterior location through the rebond foam particles. The steam 554 may maintain temperature (i.e., have a low temperature change from ingress to egress) when passing through the relatively short distances through rebond foam particles. Additionally, by introducing the steam 554 in the relatively central location of the middle mold 535, the moisture content of the steam 554 may be more evenly distributed across the mold space and the rebond foam particles within the mold space. As a result, a more efficient, faster cure process can be achieved and improved bonding consistency of the rebond foam particles can also be achieved across the molded article. It is understood that FIG. 6G illustrates a simplified steam flow from the middle mold flow holes 538 to the top mold flow holes 534 and the bottom mold flow holes 552, and that pathways for steam may also be generated on the sides of the middle mold 535 and elsewhere to provide a distributed steam flow within the rebond foam particles from the middle mold 535 to the top mold 530 and the bottom mold 540.

According to some example embodiments, the injection and evacuation of steam may be continued, for example, simultaneously, for a steaming duration of time. In this regard, the steaming duration may be controlled by the mold system control circuitry 510. In some example embodiments, the steaming duration may be manually set as a manufacturing parameter based on, for example, the volume and maximum thicknesses of molded article. According to some example embodiments, the steaming duration may be from about 15 seconds to 2 minutes, but steaming times may vary based on the article being molded and ambient temperatures. In some example embodiments, the steaming duration may be between about 30 to 40 seconds.

However, according to some example embodiments, the mold system control circuitry 510 may be configured to adjust the steaming duration based on environmental conditions such as ambient temperature and humidity levels. Additionally or alternatively, according to some example embodiments, the mold system 500 may also include sensors that may provide information to the mold system control circuitry 510 to adjust the steaming duration. For example, temperature and moisture sensors may be placed at the top mold fluid port interface 532 and the bottom mold fluid port interface 542 to measure the temperature and moisture content of the steam 556 and 558 being extracted from the mold space. Based on these measurements, the steaming duration may be adjusted dynamically based on a pre-determined temperature and moisture profile for the rebonded foam particle curing process under the current conditions.

Figure 6H:
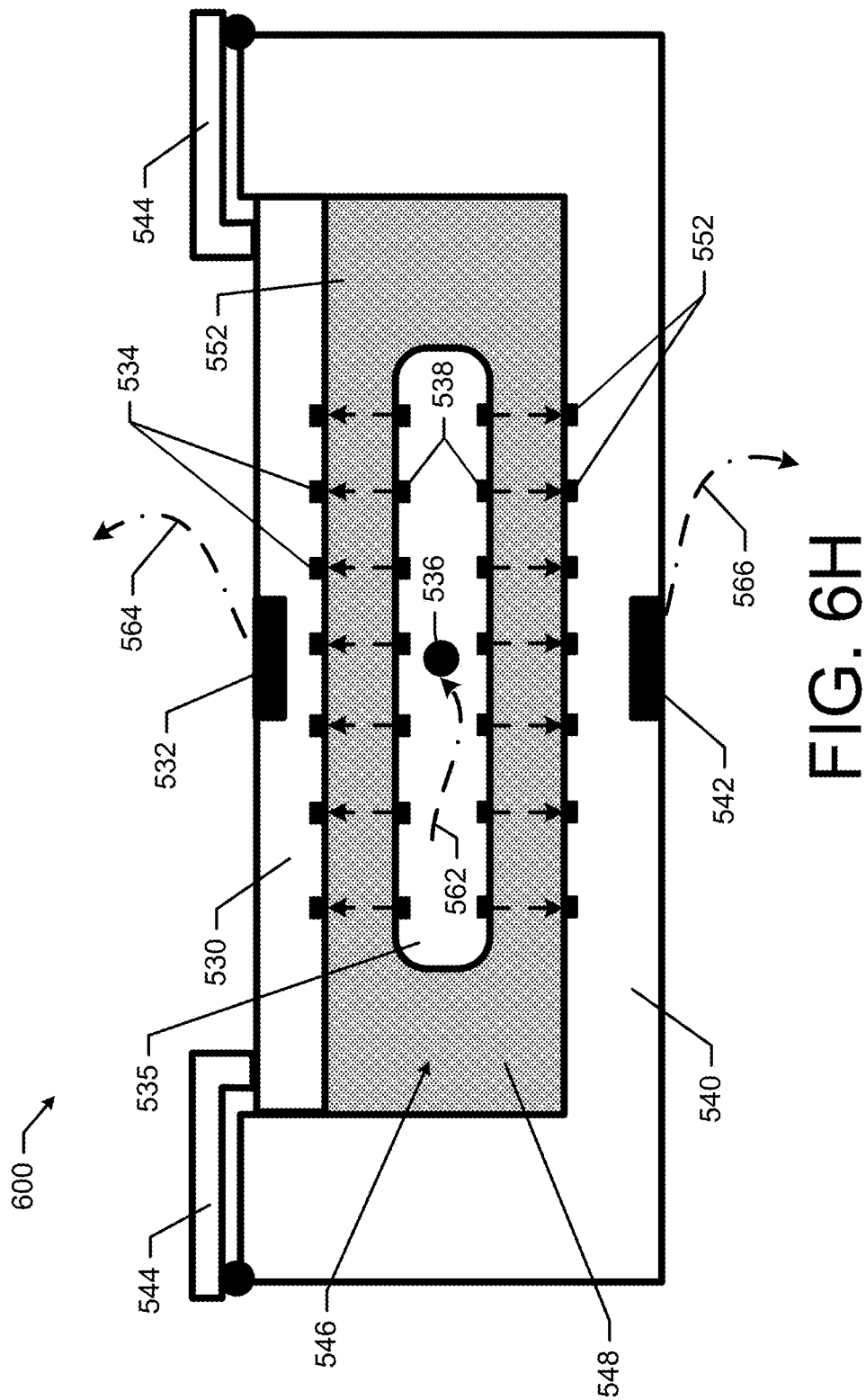

Upon completion of the steaming duration, the example method may further comprise, at 596, discontinuing the injection of the steam 554 and injecting compressed air 562 into the mold cavity 546 via the middle mold fluid port interface 536 to remove the steam 554 as shown in FIG. 6H. In this regard, once the steam duration is complete and the adhesive of the rebond foam particles is sufficiently cured, the residual steam or moisture may be rapidly removed from the mold space and the mold cavity 546 by injecting compressed air 562 into the mold space and mold cavity 546 via the middle mold fluid port interface 536 and the middle mold flow holes 538. Again, due to the relatively central location of the middle mold 535 within the mold space, the injection of compressed air 562 is highly effective at forcing the residual steam and moisture from the mold space. To discontinue the injection of steam 554, the mold system control circuitry 510 may be configured to control the steam source 565 to stop producing steam. Additionally, the mold system control circuitry 510 may be configured to control the compressed air source 570 to being producing compressed air. Additionally or alternatively, the mold system control circuitry 510 may be configured to control respective valves to discontinue the injection of steam and begin the injection of compressed air. In this regard, for example, the mold system control circuitry 510 may be configured to close the valve 580 to the steam source 565 and open the valve 585 to the compressed air source 570. Additionally, the mold system control circuitry 510 may continue to control the vacuum source 560 or the valve 575 to the vacuum source 560 to continue to create low pressures at the top mold 530 and bottom mold 540 to draw the residual steam or moisture and the compressed air 562 from the mold space and the mold cavity 546. In this regard, the residual steam or moisture and compressed air 564 may be removed via top mold fluid port interface 532 and the residual steam or moisture and compressed air 566 may be removed via the bottom mold fluid port interface 542. The removal of the residual steam or moisture in this manner, particularly with the middle mold 535 being in a relatively central injection point for the lower humidity compressed air, may speed the drying process in preparation for removal from the molds. As such, this operation of injecting and evacuating the compressed air adds to the efficiency of the manufacturing process and increases product output for a rebonded foam molding machine as described herein. It is understood that FIG. 6H illustrates a simplified flow from the middle mold flow holes 538 to the top mold flow holes 534 and the bottom mold flow holes 552, and that pathways for residual steam or moisture and compressed air may also be generated on the sides of the middle mold 535 and elsewhere to provide a distributed flow within the mold space.

Similar to the steaming duration, the compressed air may be injected and evacuated for a drying duration. According to some example embodiments, the drying duration may be controlled by the mold system control circuitry 510. In some example embodiments, the dry duration may be manually set as a manufacturing parameter based on, for example, the volume and maximum thicknesses of molded article similar to the steaming duration. For example, according to some example embodiments, the dry duration may be from about 2 hours to 6 hours. In some example embodiments, the dry duration may be less than one hour. According to some example embodiments, the mold system control circuitry 510 may be configured to adjust the drying duration based on environmental conditions such as ambient temperature and humidity levels. Additionally or alternatively, according to some example embodiments, the mold system 500 may also include sensors that may provide information to the mold system control circuitry 510 to adjust the drying duration. For example, temperature and moisture sensors may be placed at the top mold fluid port interface 532 and the bottom mold fluid port interface 542 to measure the temperature and moisture content of the residual steam or moisture and compressed air 564 and 566 being extracted from the mold space. Based on these measurements, the drying duration may be adjusted dynamically based on a pre-determined temperature and moisture profile for the rebonded foam particle drying process under the current conditions. Upon completion of the drying duration, according to some example embodiments, the mold system control circuitry 510 may be configure to control the compressed air source 570 to discontinue the injection of compressed air 562 and control the vacuum source 560 to discontinue the provision of a vacuum/low pressure. Additionally or alternatively, the mold system control circuitry 510 may be configured to control the valve 585 to the compressed air source 570 to close and control the valve 575 to the vacuum source 560 to close.

Figure 6I:
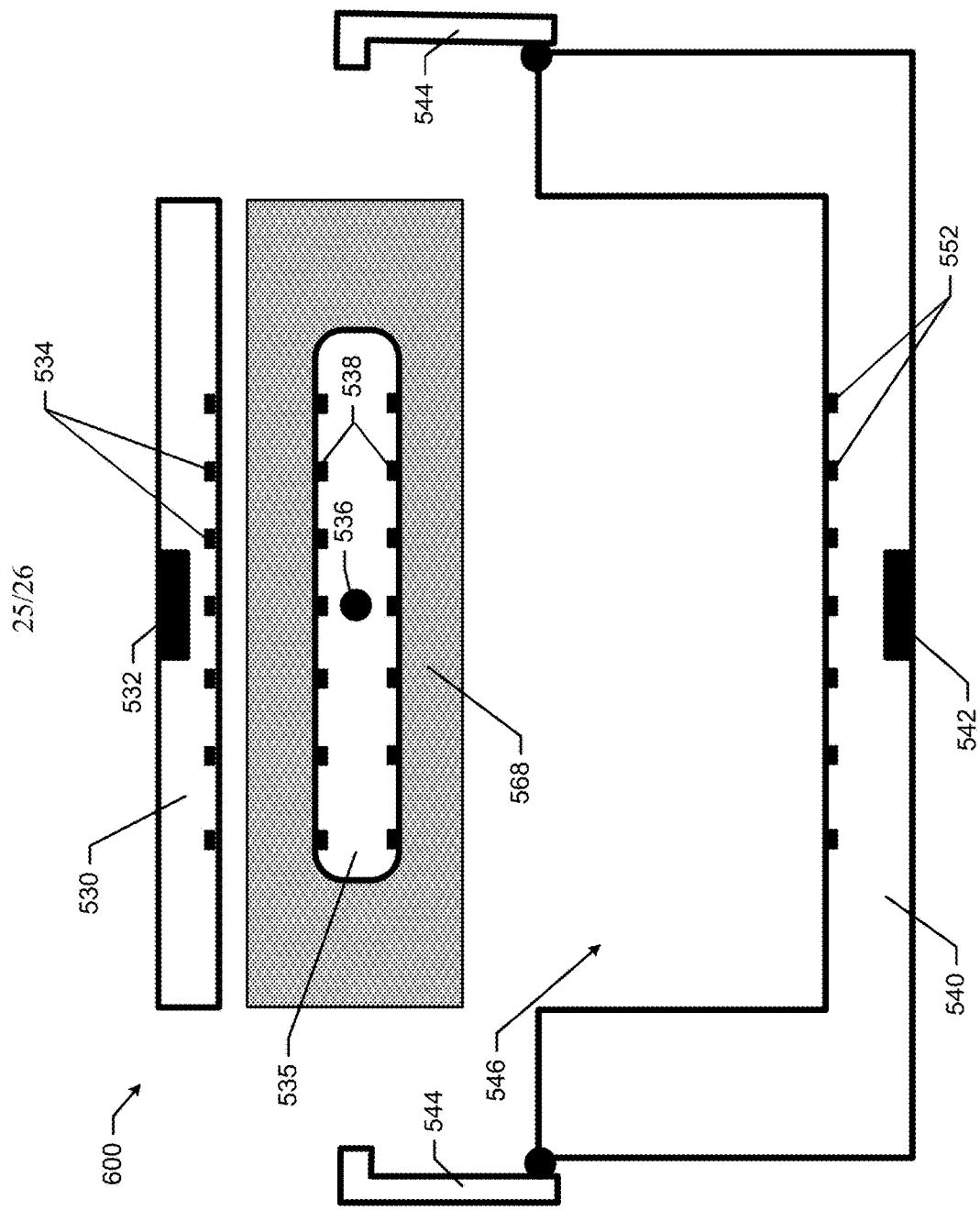

According to some example embodiments, the example method may also comprise, at 597, moving the middle mold 535 and the top mold 530 out of the mold cavity 546, as shown in FIG. 6I, for removal of the seamless rebonded foam article 568 by removing the middle mold 535 from the internal cavity 569 of the seamless rebonded foam article 568, as shown in FIG. 6J. According to some example embodiments, prior to movement of the top mold 530 and the middle mold 535, the mold clamps 544 may be disengaged, either manually or automatically under the control of the mold system control circuitry 510. The mold system control circuitry 510 may be configured to control the top mold actuator assembly 545 and the middle mold actuator assembly 550 to remove the top mold 530 and the middle mold 535 from the mold cavity 546. According to some example embodiments, the top mold 530 may be moved away from the article 568 to facilitate removal (e.g., sliding removal) of the article 568 from the middle mold 535. Subsequently, the article 568 may be permitted to cool for a duration of time prior to removal.

Removal of the seamless rebonded foam article 568 with the internal cavity 569 may be performed manually or an actuator may apply a force on the seamless rebonded foam article 568 to push the article 568 off of the middle mold 535. As shown in FIG. 6J, the article 568 is formed as a complete component (e.g., a complete seatback 200) with an internal cavity 569 without the need to glue additional molded components together and introduce seams (and associated failure points). The mold assembly 600 may then be reused in a repeated manner construct additional seamless rebonded foam articles 568 with internal cavities 569 as described herein.

According to a first example embodiment, a method for molding a seamless rebonded foam article with an internal cavity is provided. The example method may comprise loading a mold cavity, formed at least partially by a bottom mold, with a first portion of rebond foam particles to a first threshold volume. In this regard, the rebond foam particles may comprise an adhesive. The example method may further comprise moving a middle mold, via a middle mold actuator assembly controlled by mold system control circuitry, to a middle mold form position within the mold cavity to press into the first portion of rebond foam particles. The middle mold may have a width that is less than a width of the mold cavity. The example method may further comprise loading the mold cavity with a second portion of rebond foam particles to a second threshold volume that covers the middle mold, and moving a top mold, via a top mold actuator assembly controlled by the mold system control circuitry, to a top mold form position within the mold cavity to press into the second portion of rebond foam particles. The top mold may have a complementary shape to the mold cavity to compress the first and second portions of rebond foam particles. The example method may further comprise injecting steam into the mold cavity at a middle mold fluid port interface of the middle mold. In this regard, the steam may pass into the mold cavity to interact with the first and second portions of rebond foam particles via at least one middle mold flow hole in the middle mold. The example method may further comprise evacuating the steam from the mold cavity via a vacuum source coupled to a bottom mold fluid port interface and a top mold fluid port interface. The bottom mold fluid port interface may be fluidly coupled to the mold cavity via at least one bottom mold flow hole in the bottom mold and the top mold fluid port interface may be fluidly coupled to the mold cavity via at least one top mold flow hole in the top mold. The example method may also comprise, subsequent to injecting steam for a steaming duration to cure the first and second portions of rebond foam particles into a seamless article, discontinuing the injection of the steam and injecting compressed air into the mold cavity via the middle mold fluid port interface to remove the steam, and moving the middle mold and the top mold out of the mold cavity for removal of the seamless rebonded foam article by removing the middle mold from the internal cavity of the seamless rebonded foam article.

According to second example embodiment that includes the first example embodiment, the method may further comprise clamping the top mold into the mold cavity via a plurality of mold clamps to increase compression on the first and second portions of the rebond foam particles and secure the positioning of the top mold for steam injection. According to a third example embodiment that may include any one or more of the first or second example embodiments, injecting steam into the mold cavity comprises controlling, by the mold system control circuitry, a steam valve to open. According to a fourth example embodiment that may include any one or more of the first to third example embodiments, discontinuing the injection of the steam and injecting compressed air comprises controlling, by the mold system control circuitry, the steam valve to close and a compressed air valve to open. According to a fifth example embodiment that may include any one or more of the first to fourth example embodiments, the first and second portions of the rebond foam particles may comprise repurposed, ground or shredded polyurethane foam particles. According to a sixth example embodiment that may include any one or more of the first to fifth example embodiments, the first and second portions of the rebond foam particles comprise a fire-retardant substance. According to a seventh example embodiment that may include any one or more of the first to sixth example embodiments, loading the mold cavity with the first and second portions of rebond foam particles is performed by a rebond foam conveyor under control of the mold system control circuitry. According to an eighth example embodiment that may include any one or more of the first to seventh example embodiments, the seamless rebonded foam article with the internal cavity is a seatback. According to a ninth example embodiment that may include any one or more of the first to eighth example embodiments, injecting the steam and evacuating the steam is performed simultaneously. According to a tenth example embodiment that may include any one or more of the first to ninth example embodiments, the injection of compressed air is performed for a drying duration to remove residual steam or moisture under control of the mold system control circuitry.

According to an eleventh example embodiment, a rebonded foam molding machine is provided. The rebonded foam molding machine may comprise a top mold comprising a top mold contact surface and a top mold fluid port. The top mold contact surface may comprise at least one top mold flow hole. The rebonded foam molding machine may further comprise a middle mold comprising a first middle mold contact surface, a second middle mold contact surface, and a middle mold fluid port. The first middle mold contact surface or the second middle mold contact surface may comprise at least one middle mold flow hole. The rebonded foam molding machine may comprise a bottom mold comprising a bottom mold fluid port and a bottom mold contact surface shaped to form at least a portion of a mold cavity. The bottom mold contact surface may comprise at least one bottom mold flow hole. The rebonded foam molding machine may further comprise a middle mold actuator assembly configured to move the middle mold into a middle mold form position within the mold cavity, and a top mold actuator assembly configured to move the top mold into a top mold form position within the mold cavity above the middle mold in the middle mold form position. A mold space may be defined by an interior space of the mold cavity between the top mold in the top mold form position, the middle mold in the middle mold form position, and the bottom mold. The mold space may be configured to retain rebond foam particles for molding a seamless rebonded foam article with an internal cavity. The middle mold fluid port may be configured to inject steam and compressed air into the mold space via the at least one middle mold flow hole, and the top mold fluid port may be configured to evacuate steam and compressed air from the mold space via the at least one top mold flow hole. The bottom mold fluid port may be configured to draw steam and compressed air from the mold space via the at least one top mold flow hole. The middle mold actuator and the top mold actuator may be further configured to move the middle mold and the top mold out of the mold cavity to permit removal of the seamless rebonded foam article from the middle mold disposed within the internal cavity of the seamless rebonded foam article.

According to twelfth example embodiment that includes the eleventh example embodiment, the rebonded foam molding machine further comprises mold system control circuitry configured to control movement of the middle mold and the top mold via control of the middle mold actuator assembly and the top mold actuator assembly. According to a thirteenth example embodiment that includes the twelfth example embodiment, the mold system control circuitry may be configured to control valves for the injection of steam and compressed air into the mold space. According to a fourteenth example embodiment that includes any of one or more of the twelfth or thirteenth example embodiment, the rebonded foam molding machine further comprises a rebond foam conveyor configured to load rebond foam particles into the mold cavity of the bottom mold under control of the mold system control circuitry. According to a fifteenth example embodiment that includes any of one or more of the twelfth to fourteenth example embodiments, the mold system control circuitry is configured to control injection of the steam into the mold space for a steaming duration to cure the rebond foam particles. According to a sixteenth example embodiment that includes any of one or more of the eleventh to fifteenth example embodiments, the rebonded foam molding machine further comprises a plurality of mold clamps that contribute to movement of the top mold into the top mold form position and secure the top mold for steam injection. According to a seventeenth example embodiment that includes any one or more of the eleventh to sixteenth example embodiments, the rebond foam particles comprise an adhesive and repurposed, ground or shredded polyurethane foam particles. According to an eighteenth example embodiment that includes any one or more of the eleventh to seventeenth example embodiments, the seamless rebonded foam article with the internal cavity is a seatback. According to a nineteenth example embodiment that includes any one or more of the eleventh to eighteenth example embodiments, the rebonded foam molding machine further comprises side rails, wherein the top mold actuator assembly moves the top mold via the side rails and the middle mold actuator assembly moves the middle mold via the side rails. According to a twentieth example embodiment that includes any one or more of the eleventh to nineteenth example embodiments, the rebonded foam molding machine further comprises a vacuum source operably coupled to the top mold fluid port interface and the bottom mold fluid port interface to evacuate the steam from the mold space via the at least one top mold flow hole and the at least one bottom mold flow hole.

According to a twenty-first example embodiments, another method for molding a seamless rebonded foam article with an internal cavity is provided. The method may comprise moving a middle mold, via a middle mold actuator assembly controlled by mold system control circuitry, to a middle mold form position within the mold cavity to press into a first portion of rebond foam particles. The middle mold may have a width that is less than a width of the mold cavity. The example method may further comprise moving a top mold, via a top mold actuator assembly controlled by the mold system control circuitry, to a top mold form position within the mold cavity to press into a second portion of rebond foam particles. The top mold may have a complementary shape to the mold cavity to compress the first and second portions of rebond foam particles. The example method may further comprise injecting steam into the mold cavity at a middle mold fluid port interface of the middle mold. The steam may pass into the mold cavity to interact with the first and second portions of rebond foam particles via at least one middle mold flow hole in the middle mold. The example method may further comprise evacuating the steam from the mold cavity via a vacuum source coupled to a bottom mold fluid port interface and a top mold fluid port interface. The bottom mold fluid port interface may be fluidly coupled to the mold cavity via at least one bottom mold flow hole in the bottom mold and the top mold fluid port interface may be fluidly coupled to the mold cavity via at least one top mold flow hole in the top mold. The example method may further comprise, subsequent to injecting steam for a steaming duration to cure the first and second portions of rebond foam particles into a seamless article, discontinuing the injection of the steam and injecting compressed air into the mold cavity via the middle mold fluid port interface to remove the steam, and moving the middle mold and the top mold out of the mold cavity for removal of the seamless rebonded foam article.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for molding a seamless rebonded foam article with an internal cavity, the method comprising:
    loading a mold cavity, formed at least partially by a bottom mold, with a first portion of rebond foam particles to a first threshold volume, the rebond foam particles comprising an adhesive;
    moving a middle mold, via a middle mold actuator assembly controlled by mold system control circuitry, to a middle mold form position within the mold cavity to press into the first portion of rebond foam particles, the middle mold having a width that is less than a width of the mold cavity;
    loading the mold cavity with a second portion of rebond foam particles to a second threshold volume that covers the middle mold;
    moving a top mold, via a top mold actuator assembly controlled by the mold system control circuitry, to a top mold form position within the mold cavity to press into the second portion of rebond foam particles, the top mold having a complementary shape to the mold cavity to compress the first and second portions of rebond foam particles;

injecting steam into the mold cavity at a middle mold fluid port interface of the middle mold, the steam passing into the mold cavity to interact with the first and second portions of rebond foam particles via at least one middle mold flow hole in the middle mold;

evacuating the steam from the mold cavity via a vacuum source coupled to a bottom mold fluid port interface and a top mold fluid port interface, the bottom mold fluid port interface being fluidly coupled to the mold cavity via at least one bottom mold flow hole in the bottom mold and the top mold fluid port interface being fluidly coupled to the mold cavity via at least one top mold flow hole in the top mold;

subsequent to injecting steam for a steaming duration to cure the first and second portions of rebond foam particles into a seamless article, discontinuing the injection of the steam and injecting compressed air into the mold cavity via the middle mold fluid port interface to remove the steam; and moving the middle mold and the top mold out of the mold cavity for removal of the seamless rebonded foam article by removing the middle mold from the internal cavity of the seamless rebonded foam article.

2. The method of claim 1, further comprising clamping the top mold into the mold cavity via a plurality of mold clamps to increase compression on the first and second portions of the rebond foam particles and secure the positioning of the top mold for steam injection.

3. The method of claim 1, wherein injecting steam into the mold cavity comprises controlling, by the mold system control circuitry, a steam valve to open.

4. The method of claim 3, wherein discontinuing the injection of the steam and injecting compressed air comprises controlling, by the mold system control circuitry, the steam valve to close and a compressed air valve to open.

5. The method of claim 1, wherein the first and second portions of the rebond foam particles comprise repurposed, ground or shredded polyurethane foam particles.

6. The method of claim 1, wherein the first and second portions of the rebond foam particles comprise a fire-retardant substance.

7. The method of claim 1, wherein loading the mold cavity with the first and second portions of rebond foam particles is performed by a rebond foam conveyor under control of the mold system control circuitry.

8. The method of claim 1, wherein the seamless rebonded foam article with the internal cavity is a seatback.

9. The method of claim 1, wherein injecting the steam and evacuating the steam is performed simultaneously.

10. The method of claim 1, wherein the injection of compressed air is performed for a drying duration to remove residual steam or moisture under control of the mold system control circuitry.

11. A method for molding a seamless rebonded foam article with an internal cavity, the method comprising:

moving a middle mold, via a middle mold actuator assembly controlled by mold system control circuitry, to a middle mold form position within the mold cavity to press into a first portion of rebond foam particles, the middle mold having a width that is less than a width of the mold cavity;

moving a top mold, via a top mold actuator assembly controlled by the mold system control circuitry, to a top mold form position within the mold cavity to press into a second portion of rebond foam particles, the top mold having a complementary shape to the mold cavity to compress the first and second portions of rebond foam particles;

injecting steam into the mold cavity at a middle mold fluid port interface of the middle mold, the steam passing into the mold cavity to interact with the first and second portions of rebond foam particles via at least one middle mold flow hole in the middle mold;

evacuating the steam from the mold cavity via a vacuum source coupled to a bottom mold fluid port interface and a top mold fluid port interface, the bottom mold fluid port interface being fluidly coupled to the mold cavity via at least one bottom mold flow hole in the bottom mold and the top mold fluid port interface being fluidly coupled to the mold cavity via at least one top mold flow hole in the top mold;

subsequent to injecting steam for a steaming duration to cure the first and second portions of rebond foam particles into a seamless article, discontinuing the injection of the steam and injecting compressed air into the mold cavity via the middle mold fluid port interface to remove the steam; and moving the middle mold and the top mold out of the mold cavity for removal of the seamless rebonded foam article.

* * * * *